(12) United States Patent
Marshak et al.

(10) Patent No.: US 10,552,342 B1
(45) Date of Patent: Feb. 4, 2020

(54) APPLICATION LEVEL COORDINATION FOR AUTOMATED MULTI-TIERING SYSTEM IN A FEDERATED ENVIRONMENT

(71) Applicant: EMC IP Holding Company LLC, Hopkinton, MA (US)

(72) Inventors: Marik Marshak, Newton, PA (US); Alexandr Veprinsky, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 13/835,946

(22) Filed: Mar. 15, 2013

(51) Int. Cl.
*G06F 12/00* (2006.01)
*G06F 3/06* (2006.01)
*G06F 12/122* (2016.01)

(52) U.S. Cl.
CPC ............ *G06F 12/122* (2013.01); *G06F 3/061* (2013.01); *G06F 3/0649* (2013.01); *G06F 3/0685* (2013.01)

(58) Field of Classification Search
CPC .... G06F 12/122; G06F 3/0649; G06F 3/0685; G06F 3/061
See application file for complete search history.

(56) References Cited

U.S. PATENT DOCUMENTS

| | | | |
|---|---|---|---|
| 7,054,883 B2 | 5/2006 | Meiri et al. | |
| 7,475,207 B2 | 1/2009 | Bromling et al. | |
| 7,613,890 B1 | 11/2009 | Meiri | |
| 7,779,291 B2 | 8/2010 | Yoder et al. | |
| 7,822,939 B1 * | 10/2010 | Veprinsky et al. | 711/170 |
| 7,949,637 B1 | 5/2011 | Burke | |
| 8,185,708 B2 | 5/2012 | LeCrone et al. | |
| 8,335,899 B1 | 12/2012 | Meiri et al. | |
| 8,364,858 B1 | 1/2013 | Martin et al. | |
| 8,490,086 B1 * | 7/2013 | Cook et al. | 718/1 |
| 9,043,530 B1 * | 5/2015 | Sundaram | G06F 3/068 711/100 |

(Continued)

OTHER PUBLICATIONS

Host. (2001). In Hargrave's communications dictionary, Wiley. Hoboken, NJ: Wiley. Retrieved from http://search.credoreference.com/content/entry/hargravecomms/host/0.*

(Continued)

*Primary Examiner* — Kalpit Parikh
(74) *Attorney, Agent, or Firm* — Muirhead and Saturnelli, LLC

(57) ABSTRACT

Synchronization of data layouts and resource utilizations at one or more remote replica sites with the workload and data access statistics at the primary site allows for an efficient and effective workload support transfer in the event of site failover from a primary site to a remote site. Relevant data access information about workload being supported at the primary site is monitored and access pattern information is generated that provides relevant information about frequency and/or rate of access of data on the primary site. The access pattern information is generated and transmitted by a host and/application running on the host. The access pattern information is exported and imported to enable independent decisions to be made a remote site, storing replicated data from the primary site, on how best to utilize its available resources to match the performance requirements currently being supported by the primary site.

18 Claims, 17 Drawing Sheets

(56) References Cited

U.S. PATENT DOCUMENTS

| | | | |
|---|---|---|---|
| 2007/0208788 A1* | 9/2007 | Chakravarty et al. | 707/204 |
| 2009/0070541 A1 | 3/2009 | Yochai et al. | |
| 2010/0257399 A1* | 10/2010 | Brown | H04L 69/40 714/4.1 |
| 2010/0281230 A1* | 11/2010 | Rabii | G06F 3/0605 711/165 |
| 2012/0023292 A1* | 1/2012 | Saito | G06F 1/3203 711/114 |
| 2012/0117029 A1* | 5/2012 | Gold | 707/651 |
| 2014/0149357 A1* | 5/2014 | Gupta | 707/652 |
| 2014/0181443 A1* | 6/2014 | Kottomtharayil et al. | 711/162 |

OTHER PUBLICATIONS

U.S. Appl. No. 12/319,122, filed Dec. 31, 2008, Burke et al.
U.S. Appl. No. 12/586,837, filed Sep. 29, 2009, LeCrone et al.
U.S. Appl. No. 12/932,080, filed Feb. 17, 2011, Meiri et al.
U.S. Appl. No. 13/136,359, filed Jul. 29, 2011, Van Der Goot.
U.S. Appl. No. 13/338,719, filed Dec. 28, 2011, LeCrone et al.

* cited by examiner

APPLICATION LEVEL COORDINATION FOR AUTOMATED MULTI-TIERING SYSTEM IN A FEDERATED ENVIRONMENT

TECHNICAL FIELD

This application relates to computer storage devices and, more particularly, to the field of managing data stored on computer storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass., such as in connection with one or more of EMC's Symmetrix products. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Information Lifecycle Management (ILM) concerns the management of data throughout the data's lifecycle. The value of data may change over time and, accordingly, the needs for the storage and accessibility of the data may change during the lifecycle of the data. For example, data that is initially accessed often may, over time, become less valuable and the need to access that data become more infrequent. It may not be efficient for such data infrequently accessed to be stored on a fast and expensive storage device. On the other hand, older data may suddenly become more valuable and, where once accessed infrequently, become more frequently accessed. In this case, it may not be efficient for such data to be stored on a slower storage array when data access frequency increases.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

Data transfer among storage devices, including transfers for data replication or mirroring functions, may involve various data synchronization operation modes and techniques to provide reliable protection copies of data among a source or local site and a destination or remote site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired.

For both synchronous and asynchronous transfers, it may be desirable to maintain a proper ordering of writes such that any errors or failures that occur during data transfer may be properly identified and addressed such that, for example, incomplete data writes be reversed or rolled back to a consistent data state as necessary. Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system.

For further discussions of data ordering and other techniques used for synchronous and asynchronous data replication processing in various types of systems, including types of RDF systems and products produced by EMC Corporation of Hopkinton, Mass., reference is made to, for example, U.S. Pat. No. 8,335,899 to Meiri et al., entitled "Active/Active Remote Synchronous Mirroring," U.S. Pat. No. 8,185,708 to LeCrone et al., entitled "Host Implementation of Triangular Asynchronous Replication," U.S. Pat. No. 7,779,291 to Yoder et al., entitled "Four Site Triangular Asynchronous Replication," U.S. Pat. No. 7,613,890 to Meiri, entitled "Consistent Replication Across Multiple Storage Devices," and U.S. Pat. No. 7,054,883 to Meiri et al., entitled "Virtual Ordered Writes for Multiple Storage Devices," which are all incorporated herein by reference.

In connection with data replication using RDF systems, one issue that may occur is discrepancies in data storage management between R1 and R2 devices when ILM techniques are used. For example, data that is accessed frequently on an R1 device may be stored and managed at a location on the R1 device that is suitable for the need for frequent access of that data. However, when replicated to the R2 device, that same data, existing as a data backup copy, may not be accessed as frequently. Accordingly, the data on the R2 device, although being a copy of the R1 data, may be stored and managed differently on the R2 device than on the R1 device. In situations of failover to the R2 device, or other uses for the R2 device, the R2 device may not immediately be able to support the workload as the new primary device because the data copy stored thereon may not be stored as efficiently or effectively as on the R1 device. Transferring all information between the R1 and R2 devices during normal operation to maintain the same ILM storage management on each of the devices may not be a practical solution due to the amount of information transfer that this would require, among other reasons.

Accordingly, it would be desirable to provide a system that allows for the efficient management of data in a storage array among multiple storage devices, particularly involving considerations of how data is accessed in connection with the storage of data on the multiple storage devices.

SUMMARY OF THE INVENTION

According to the system described herein, a method is provided for managing data among a plurality of storage arrays. Access of data on a first storage array of a plurality of storage arrays is monitored, and in which the monitoring is performed at a host performing operations in connection with the first storage array. At the host, access pattern information is generated indicating at least a frequency or a rate at which data is being accessed on the first storage array. The access pattern information is transmitted from the host. Data stored on a second storage array of the plurality of storage arrays is managed according to the access pattern information, wherein the data stored on the second storage array corresponds to the data stored on the first storage array. The access pattern information may be transmitted from the host in connection with data replicated from the first storage array to the second storage array and/or the access pattern information may be received by another host that makes management decisions concerning the data stored on the second storage array. The data stored on the second storage array is managed to match performance requirements being supported by the first storage array. Managing data on the second storage array may include storing the data among a plurality of storage tiers of the second storage array, and in which feature of a first storage tier of the plurality of storage tiers is different from a feature of a second storage tier of the plurality of storage tiers. The access pattern information includes information concerning at least one of: an access rate of the data, frequency of use of the data, a time of last use of the data, and source/requestor information of the data. The access pattern information may be transmitted by the host concurrently with being replicated from the first storage array to the second storage array. The access pattern information may be periodically transmitted from the host to the second storage array.

According further to the system described herein, a non-transitory computer readable medium stores software for managing data among a plurality of storage arrays. The software includes executable code that monitors access of data on a first storage array of a plurality of storage arrays, wherein the monitoring is performed at a host performing operations in connection with the first storage array. Executable code is provided that generates, at the host, access pattern information indicating at least a frequency or a rate at which data is being accessed on the first storage array. Executable code is provided that transmits, from the host, the access pattern information. Executable code is provided that manages data stored on a second storage array of the plurality of storage arrays according to the access pattern information, wherein the data stored on the second storage array corresponds to the data stored on the first storage array. The access pattern information may be transmitted from the host in connection with data replicated from the first storage array to the second storage array and/or the access pattern information may be received by another host that makes management decisions concerning the data stored on the second storage array. The data stored on the second storage array is managed to match performance requirements being supported by the first storage array. Managing data on the second storage array may include storing the data among a plurality of storage tiers of the second storage array, and in which feature of a first storage tier of the plurality of storage tiers is different from a feature of a second storage tier of the plurality of storage tiers. The access pattern information includes information concerning at least one of: an access rate of the data, frequency of use of the data, a time of last use of the data, and source/requestor information of the data. The access pattern information may be transmitted by the host concurrently with being replicated from the first storage array to the second storage array. The access pattern information may be periodically transmitted from the host to the second storage array.

According further to the system described herein, a storage system is provided including at least one host, a plurality of storage arrays including a first storage array storing data and a second storage array that replicates the data stored on the first storage array, and a plurality of interconnected directors, wherein at least some of the directors handle reading and writing data instructions for the first storage array received from the at least one host. A non-transitory computer-readable medium stores software for managing data. The software includes executable code that monitors access of data on the first storage array, wherein the monitoring is performed at the at least one host performing operations in connection with the first storage array. Executable code is provided that generates, at the host, access pattern information indicating at least a frequency or a rate at which data is being accessed on the first storage array. Executable code is provided that transmits, from the host, the access pattern information. Executable code is provided that manages data stored on the second storage array of the plurality of storage arrays according to the access pattern information, wherein the data stored on the second storage array corresponds to the data stored on the first storage array. The access pattern information may be transmitted by the host concurrently with being replicated from the first storage array to the second storage array. The access pattern information may be periodically transmitted from the host to the second storage array.

BRIEF DESCRIPTION OF THE DRAWINGS

Embodiments of the system are described with reference to the several figures of the drawings, described as follows.

DETAILED DESCRIPTION OF VARIOUS EMBODIMENTS

Figure 1:
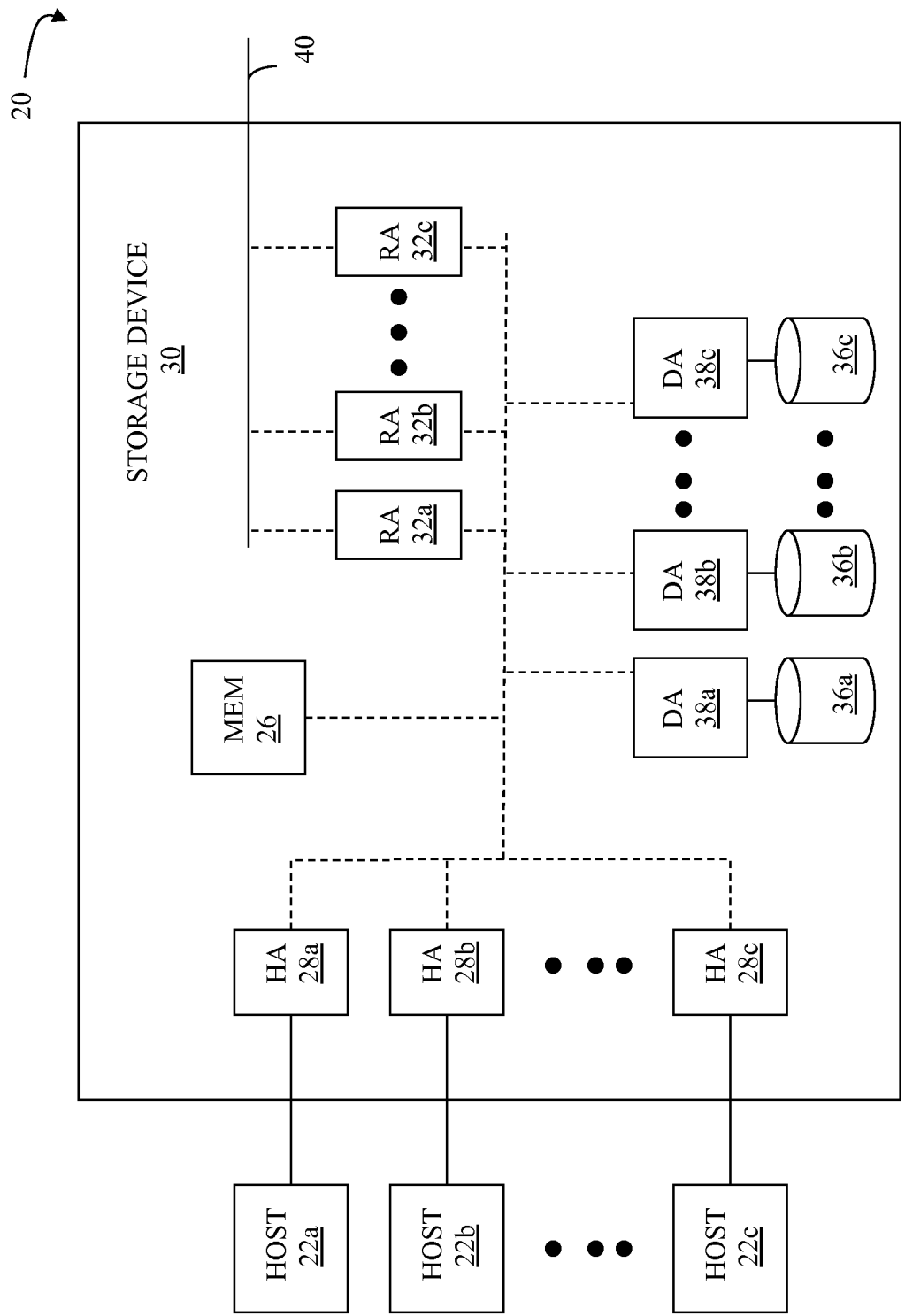
FIG. 1 is a schematic illustration showing a plurality of hosts coupled to a data storage device that may be used according to an embodiment of the system described herein.

FIG. 1 is a schematic illustration 20 showing a plurality of hosts 22a-22c coupled to a data storage device 30 that may be used according to an embodiment of the system described herein. The data storage device 30 includes a memory 26 that facilitates operation of the storage device 30, as further described elsewhere herein. The data storage device also includes a plurality of host adapters (HA's) 28a-28c that handle reading and writing of data between the hosts 22a-22c and the storage device 30. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 30 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to a remote link 40, such as an RDF link, and are similar to the HA's 28a-28c, but are used to transfer data between the storage device 30 and other storage devices (see FIG. 3 and corresponding description) that are also coupled to the remote link 40. The storage device 30 may be coupled to additional remote links (not shown) in addition to the remote link 40.

The storage device 30 may also include one or more disks 36a-36c, each containing a different portion of data stored on the storage device 30. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 30 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 30 may be provided as a stand-alone device coupled to the hosts 22a-22c as shown in FIG. 1 or, alternatively, the storage device 30 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
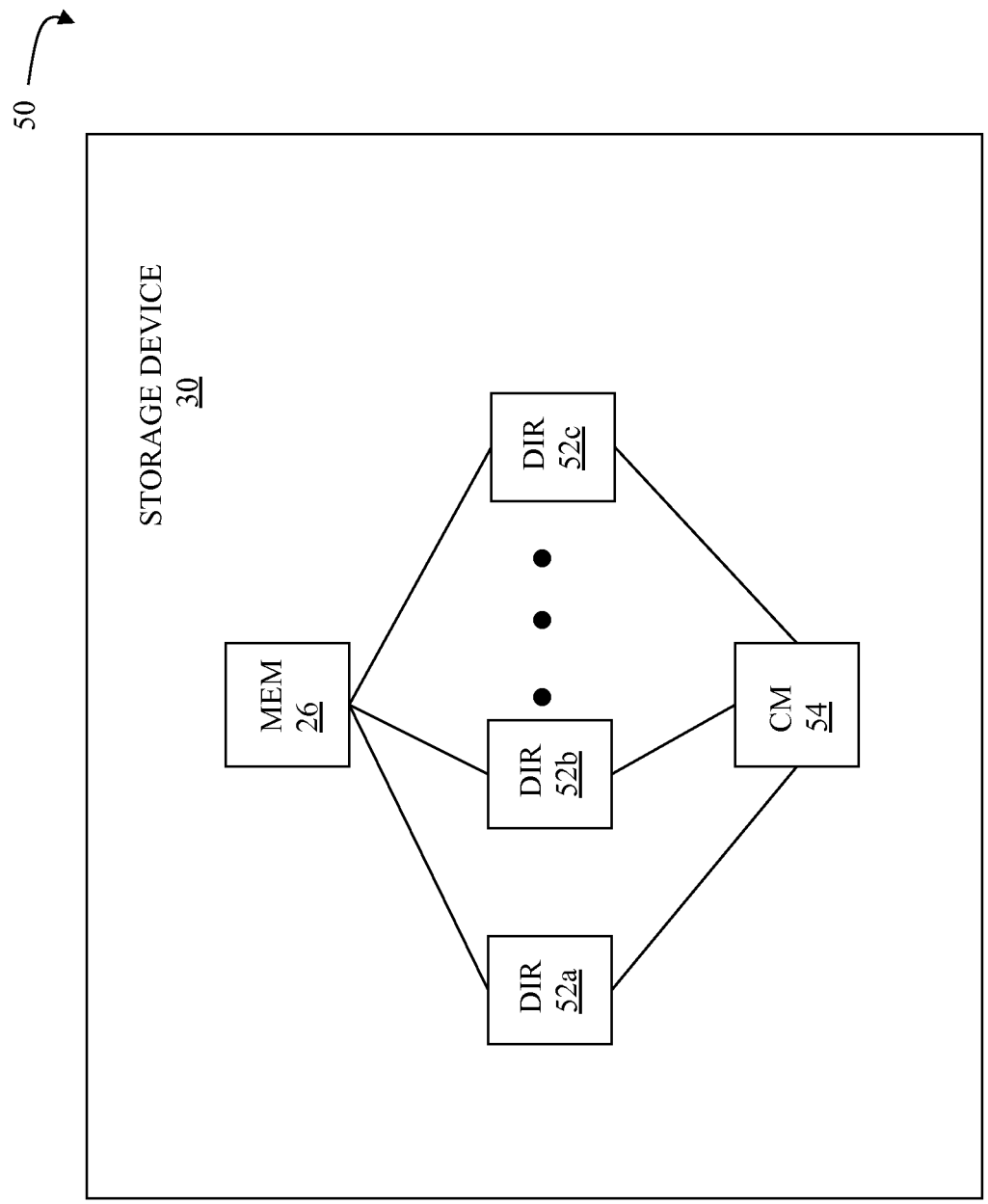
FIG. 2 is a schematic illustration showing an embodiment of the storage device where each of a plurality of directors are coupled to the memory that may be used according to an embodiment of the system described herein.

FIG. 2 is a schematic illustration 50 showing an embodiment of the storage device 30 where each of a plurality of directors 52a-52c are coupled to the memory 26 that may be used according to an embodiment of the system described herein. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is different from any particular platform described herein.

The system described herein may be suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 3:
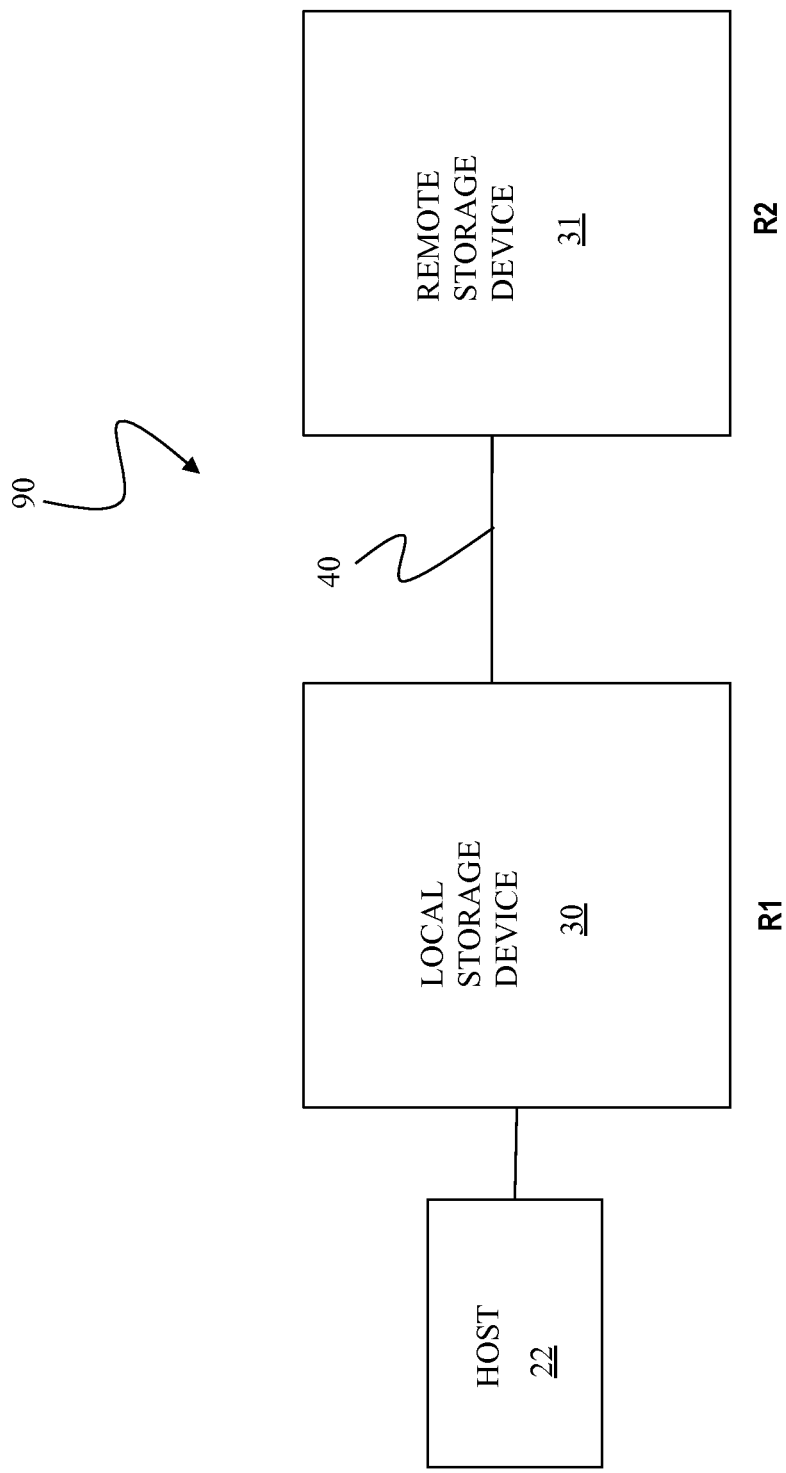
FIG. 3 is a schematic illustration showing a storage array including the storage device, as a local storage device, coupled to a remote storage device via the remote link that may be used according to an embodiment of the system described herein.

FIG. 3 is a schematic illustration showing a storage system 90 including the storage device 30, as a local storage device, coupled to a remote storage device 31 via the remote link 40 that may be used according to an embodiment of the system described herein. The remote storage device 31 may be the same type of storage device as the storage device 30, and have similar components as described with respect to the storage device 30, and/or may be a different type of storage device. The local storage device 30 and the remote storage device 31 may operate as an RDF product for providing backup and/or mirrored copies of data, as further discussed elsewhere herein. The RDF functionality described herein may be applied so that the data for at least a portion of the disks 36a-36c of the local storage device 30 is copied, using RDF, to at least a portion of similar disks of the remote storage device 31. It is possible that other data of the storage devices 30, 31 is not copied between the storage devices 30, 31 and, thus, the data stored on the storage devices 30, 31 may not be identical.

Providing an RDF mapping between portions of the local storage device 30 and the remote storage device 31 involves setting up a logical device on the remote storage device 31 that is a remote mirror for a logical device on the local storage device 30. One or more of the hosts 22a-22c, illustrated as a host 22, may read and write data from and to the logical device on the local storage device 30 and the RDF mapping causes modified data to be transferred from the local storage device 30 to the remote storage device 31 using the RA's 32a-32c and similar RA's on the remote storage device 31 that are connected via the remote link 40. In steady state operation, the logical device on the remote storage device 31 may contain data that is a copy of, or at least substantially identical to, the data of the logical device on the local storage device 30. The logical device on the local storage device 30 that is accessed by the host 22 may be referred to as the "R1 device" or "R1 volume" (or just "R1") while the logical device on the remote storage device 31 that contains a copy of the data on the R1 volume is called the "R2 device" or "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein In an embodiment, the system described herein may be used in connection with SRDF synchronous (SRDF/S) transfers. For an SRDF/S transfer, data written from one of the hosts 22a-22c to the local storage device 30 may be stored locally, for example on one of the data volumes 36a-36c of the local storage device 30. After data is written from one or more of the hosts 22a-22c to the local storage device 30, the data is transferred from the local storage device 30 to the remote storage device 31 using RDF. Receipt by the remote storage device 31 is then acknowledged to the local storage device 30 which then provides an acknowledge back to the appropriate one of the hosts 22a-22c for the initial write. In other embodiments, the system described herein may also be used in connection with, or in combination with, other modes of data transfer including, for example, asynchronous (SRDF/A) transfers and/or other appropriate data transfer systems and devices.

Figure 4:
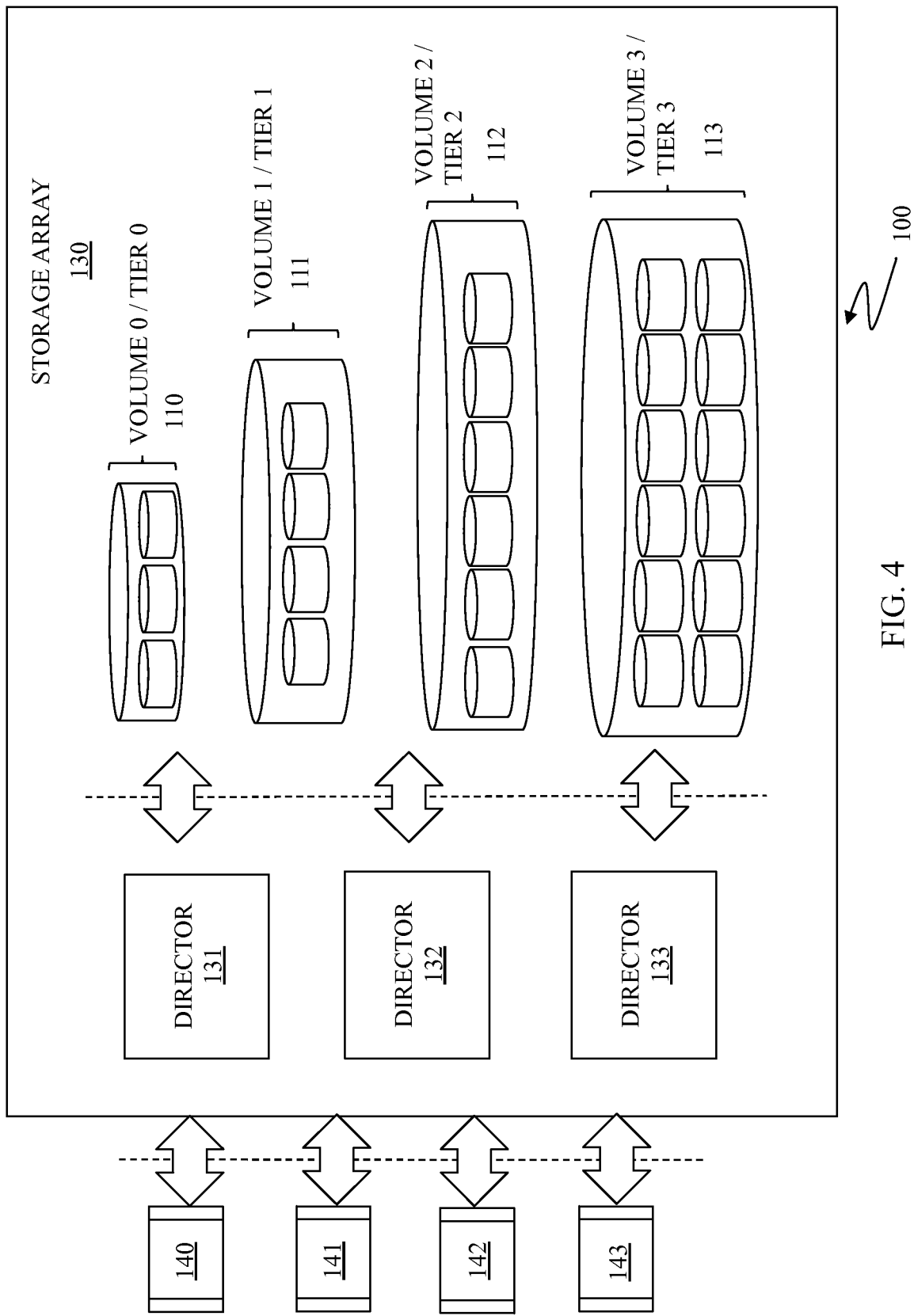
FIG. 4 is a schematic illustration showing a storage system or array that may be used according to an embodiment of the system described herein.

FIG. 4 is a schematic illustration 100 showing a storage system or array 130 that may be used according to an embodiment of the system described herein. The storage array 130 may include multiple directors 131-133 and multiple storage volumes (volumes 0-3) 110-113. Host applications 140-144 and/or other entities (e.g., other storage devices, SAN switches, etc.) request data writes and data reads to and from the storage array 130 that are facilitated using one or more of the directors 131-133. The storage array 130 may include similar features and components as that discussed in connection with the storage device 30 with appropriate modifications made in accordance with the functionality discussed elsewhere herein.

The volumes 110-113 may be provided in multiple storage tiers (tiers 0-3) that may have different storage characteristics, such as speed, cost, reliability, availability, security and/or other characteristics. Techniques involving the management of data between volumes on multiple storage tiers and/or between multiple storage tiers within a single volume, including the use of thin provisioning technology, is discussed, for example, in co-pending U.S. patent applications: U.S. Patent App. Pub. No. 2009/0070541 A1 Yochai et al., entitled "Automated Information Life-Cycle Management With Thin Provisioning," U.S. Pat. No. 7,949,637 to Burke, entitled "Storage Management For Fine Grained Tiered Storage With Thin Provisioning"; U.S. Pat. No. 7,822,939 to Veprinsky, entitled "Date De-Duplication Using Thin Provisioning"; and U.S. Ser. No. 12/586,837 to LeCrone et al., filed Sep. 29, 2009, entitled "Sub-Tiering Data At The Volume Level," which are all incorporated herein by reference.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. Reference is further made to U.S. Pat. No. 8,364,858 to Martin et al., entitled "Normalizing Capacity Utilization Within Virtual Storage Pools," which is incorporated herein by reference, that discloses the collection of utilization statistics across individual storage devices and the use of such collected statistics to control and/or normalize the utilization of storage capacity among members of a storage pool.

Figure 5:
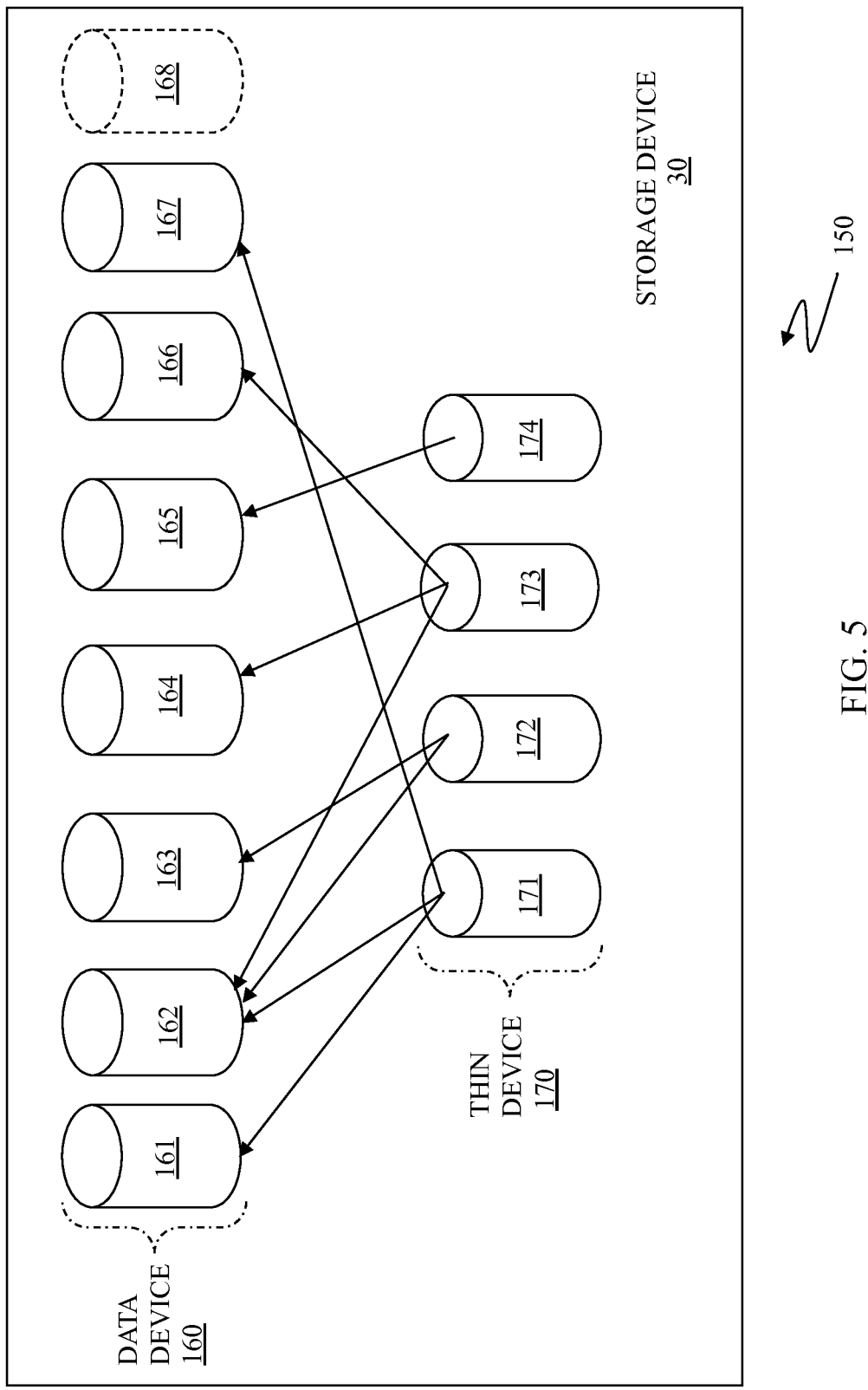
FIG. 5 is a schematic diagram showing the storage device as including a plurality of data devices and a plurality of thin devices that may be used in connection with the system described herein.

FIG. 5 is a schematic diagram 150 showing the storage device 30 as including a plurality of data devices 161-168 and a plurality of thin devices 171-174 that may be used in connection with the system described herein. Alternatively, in other embodiments that may be used in connection with the system described herein, instead of being separate devices, the data devices 161-168 may be sections of one data device 160 and, similarly, the thin devices 171-174 may be sections of one thin device 170. Further, the thin devices 171-174, and/or sections of the thin device 170, may be incorporated into the storage device 30 and/or may be stored and accessed externally to the storage device 30. The data devices 161-168 may be implemented as a logical device like standard logical devices provided in a Symmetrix data storage device produced by EMC Corporation of Hopkinton, Mass. The data device section 168 is illustrated with broken lines to indicate that the data device section 168 does not yet exist but may be created. In some embodiments, the data device sections 161-167 may not be directly useable (visible) to hosts coupled to the storage device 30. Each of the data devices sections 161-167 may correspond to a portion (including a whole portion) of one or more of the disk drives 36a-c. Thus, for example, the data device section 161 may correspond to the disk drive 36a, may correspond to a portion of the disk drive 36b, or may correspond to a portion of the disk drive 36a and a portion of the disk drive 36b. The data devices sections 161-167 may be designated as corresponding to different classes, so that different ones of the data devices 161-167 correspond to different physical storage having different relative access speeds or RAID protection type (or some other relevant distinguishing characteristic or combination of characteristics), as further discussed elsewhere herein.

The thin devices 171-174 may appear to a host coupled to the storage device 30 as a logical volume (logical device) containing a contiguous block of data storage. Each of the thin devices 171-174 may contain pointers to some or all of the data devices 161-167 (or portions thereof), as further discussed elsewhere herein. As illustrated, in some embodiments, only one thin device may be associated with a data device while, in other embodiments, multiple thin devices may be associated with the same data devices. In some instances, an implementation according to the system described herein may allow for hybrid logical devices where a single logical volume has portions that behave as a data device and/or portions that behave as a thin device.

A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to one or more data devices, which are logical devices that map logical storage space of the data device to physical storage space on the disk drives 36a-36c. As further discussed elsewhere herein, an access of the logical storage space of the thin device results in either a null pointer (or equivalent) indicating that no corresponding physical storage space has yet been allocated, or results in a reference to a data device (or section thereof) which in turn references the underlying physical storage space.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated.

In an embodiment herein, different portions of the physical data may be automatically moved between different physical disk drives or other storage devices with the same or different characteristics according to one or more policies. For example, data may be initially allocated to a particular fast disk drive, but a portion of the data that has not been used over a period of time (for example, three weeks) may be automatically moved, according to the system described herein, to a slower (and perhaps less expensive) disk drive.

The physical data may then be automatically moved back to the faster disk drive if the data is subsequently used and/or accessed according to a policy or other criteria (for example, accessed twice in any given week), as further described herein. Thus, the system described herein may operate to automatically move data between disk drives or other storage devices within the same machine according to the one or more policies.

A policy may be configured by an administrator on a system-wide level or may be specific to a particular user on a specific logical device. The system described herein allows for the remapping of physical data based on policy criteria or other statistics. For example, the policy may be based on the last time data was used and/or accessed. Alternatively, the policy may be based on anticipated use of data over specific times and/or dates. For example, data that is expected to be used at a particular time may be stored on (or relocated to) relatively fast disk drives and then moved to relatively slow disk drives when it is expected that the data will not be used again for a lengthy period of time. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable, available and/or secure as compared with the data associated with user B.

In an embodiment herein, data may be moved between physical disk drives (or other physical storage) having different characteristics, such as speed, cost, reliability, availability, security and/or other characteristics. As discussed elsewhere herein, logical data devices may be established having different classes corresponding to characteristics of the physical disk drives to which the data devices are mapped. Further, it should be noted that any section of the logical device may be moved according to the system described herein based on the characteristics of the data (and governed by default or specific policies).

As discussed elsewhere herein, the data devices 161-167 may be associated with physical storage areas (e.g., disk drives, tape, solid state storage, etc.) having different characteristics. In various embodiments, the physical storage areas may include multiple tiers of storage in which each tier of storage areas and/or disk drives that may be ordered according to different characteristics and/or classes, such as speed, technology and/or cost. The thin devices 171-174 may appear to a host coupled to the storage device 30 as a logical volume (logical device) containing a contiguous block of data storage, as discussed herein. Each thin device 171-174 may correspond to a particular data device, a portion thereof and/or multiple data devices. Accordingly, each thin device 171-174 may map to storage areas across multiple storage tiers. As a result, although each thin device 171-174 may appear as containing a logically contiguous block of storage, each thin device 171-174 may allow for blocks of data to be transparently stored (and/or retrieved) from discontiguous storage pools made up of the varying classes of data storage devices. In this way, the granularity at which the system for tiered storage described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage tiers or different sized data blocks within a single storage tier.

Figure 6:
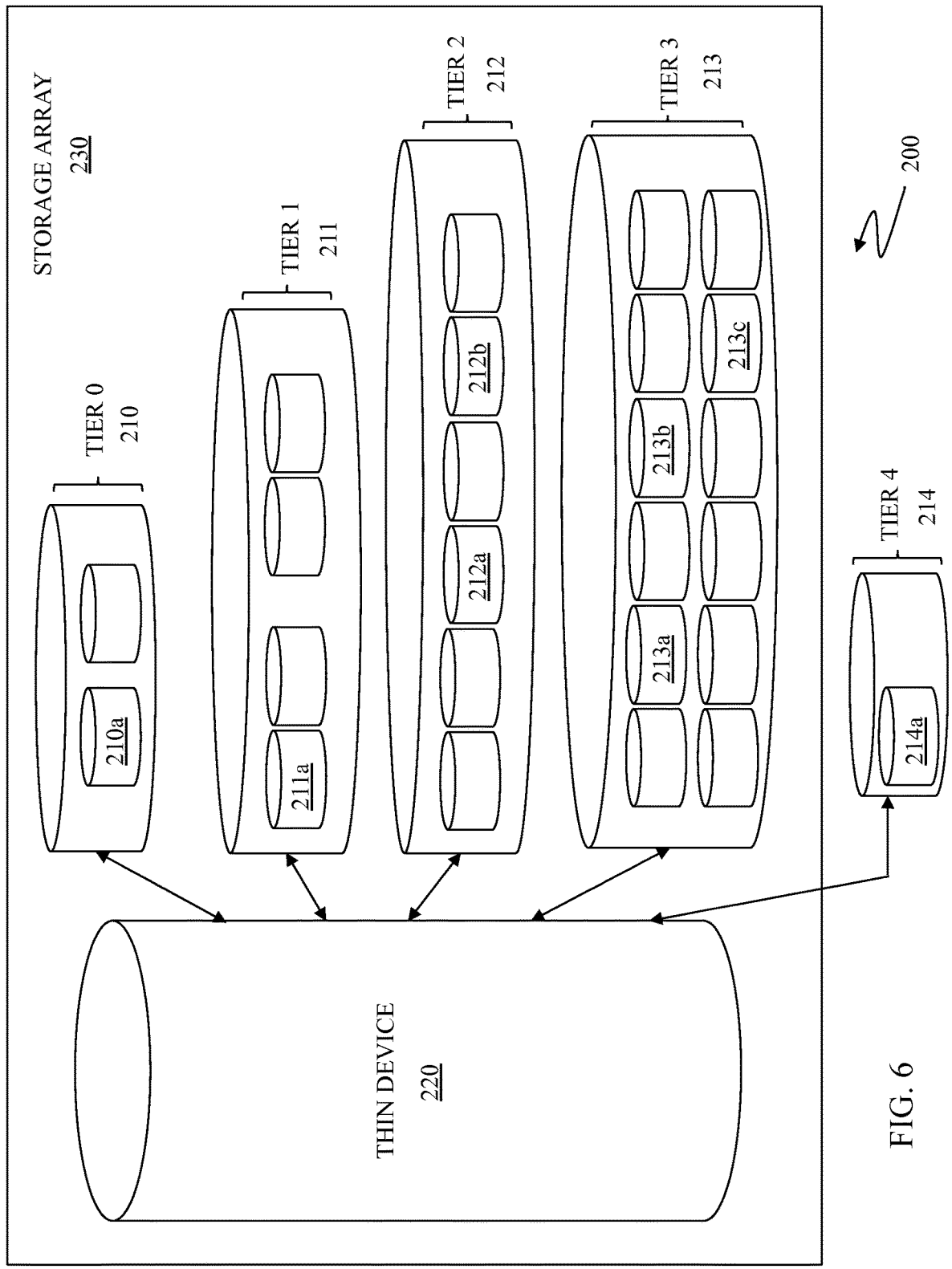
FIG. 6 is a schematic illustration of a fine grained tiered storage array according to an embodiment of the system described herein.

FIG. 6 is a schematic illustration 200 of a fine grained tiered storage array 230 according to an embodiment of the system described herein. The storage array 230 is shown including a thin device 220, like the thin devices 171-174 discussed elsewhere herein, that may be coupled to multiple physical storage devices across multiple storage tiers. As discussed elsewhere herein, the storage tiers may be associated with data devices, like the data devices 161-167 discussed herein, so that, for example, there is one data device for each storage tier, one data device for multiple storage tiers, any portion of a data device for any portion of the pools of storage shown for the storage tiers, and/or any combinations thereof. For example, in an embodiment, a top tier storage pool 210 (e.g., tier 0) may include flash/solid state disk (SSD) drives that are relatively fast and expensive. Other storage pools 211-213 (e.g., tiers 1-3) may include disk drives of decreasing speeds or other configurations (i.e., 15 k rpm, 10 k rpm, 7.5 k rpm redundant array of independent disk (RAID) storage). The lowest tier of storage pool 214 (e.g., tier 4) may include, for example, tape storage, largest capacity disk drives (such as massive array of idle disks (MAID) storage). As illustrated, the last storage tier 214 may include storage devices external to the storage device 230 that may be suitable for long term storage of data that is infrequently accessed. However, note that external storage could have specific characteristics such as tape, or might perform additional processing to optimize the storage of data, such as de-duplication. In some embodiments, external storage might be used to support tier 2 or tier 3 class applications.

The thin device 220 may map to different storage areas (devices) across multiple tiers. As discussed herein, the granularity of the system described herein may be less than at the file level and allow for blocks of data of any size to be stored across multiple storage tiers 210-213 of the storage device 230 in a process that is transparent to the host and/or host application. For example, in the illustrated embodiment, the thin device 220 may map blocks of data to storage areas (devices) such as a storage area 210a in the pool of storage of the top storage tier 210, a storage area 211a in the pool of storage of the next storage tier 211, storage areas 212a, 212b in pool of storage of the next storage tier 212, and storage areas 213a, 213b, 213c in the pool of storage of the next storage tier 213. As discussed elsewhere herein, the last storage tier 214 may include external storage and the system described herein may map to a storage area 214a in the pool of storage in the tier 614.

At least one storage tier (e.g., the lowest storage tier 214) may include redundant data elimination (RDE)/de-duplication storage. RDE/de-duplication technology involves identifying multiple instances of data and storing only a single instances of that data (e.g., files, blocks, chunks, tracks, etc.) thereby eliminating redundant storage of the same data. RDE/de-duplication technologies may be particularly applicable for data that is accessed and/or changed infrequently. For example, RDE/de-duplication may be applied only for data blocks that have not been modified in a particular number of hours, days etc. Further, the system may include processing to separate data blocks, files etc. that have been de-duped in the case where the data is no longer suitable for RDE/de-duplication. For example, parts of two separate data files may initially be redundant and subjected to RDE to reduce storage space usage; however, if a write is subsequently requested for only one of the initially redundant data files, then the initially redundant data files may require separate processing and no longer be appropriate for RDE. RDE/de-duplication may allow fewer physical data blocks to support reads from multiple different users, applications, hosts etc.

Mirroring (backup) of data may also be facilitated by tiered storage across multiple tiers according to the system described herein. For example, data that is accessed frequently may be stored on a fast storage device (tier 0) while a mirrored copy of the data that is not expected to be accessed may be stored on a slower storage device in one or more other tiers (e.g., tiers 1-4). Accordingly, the same data may be stored on storage devices of multiple tiers of storage pools.

Figure 7:
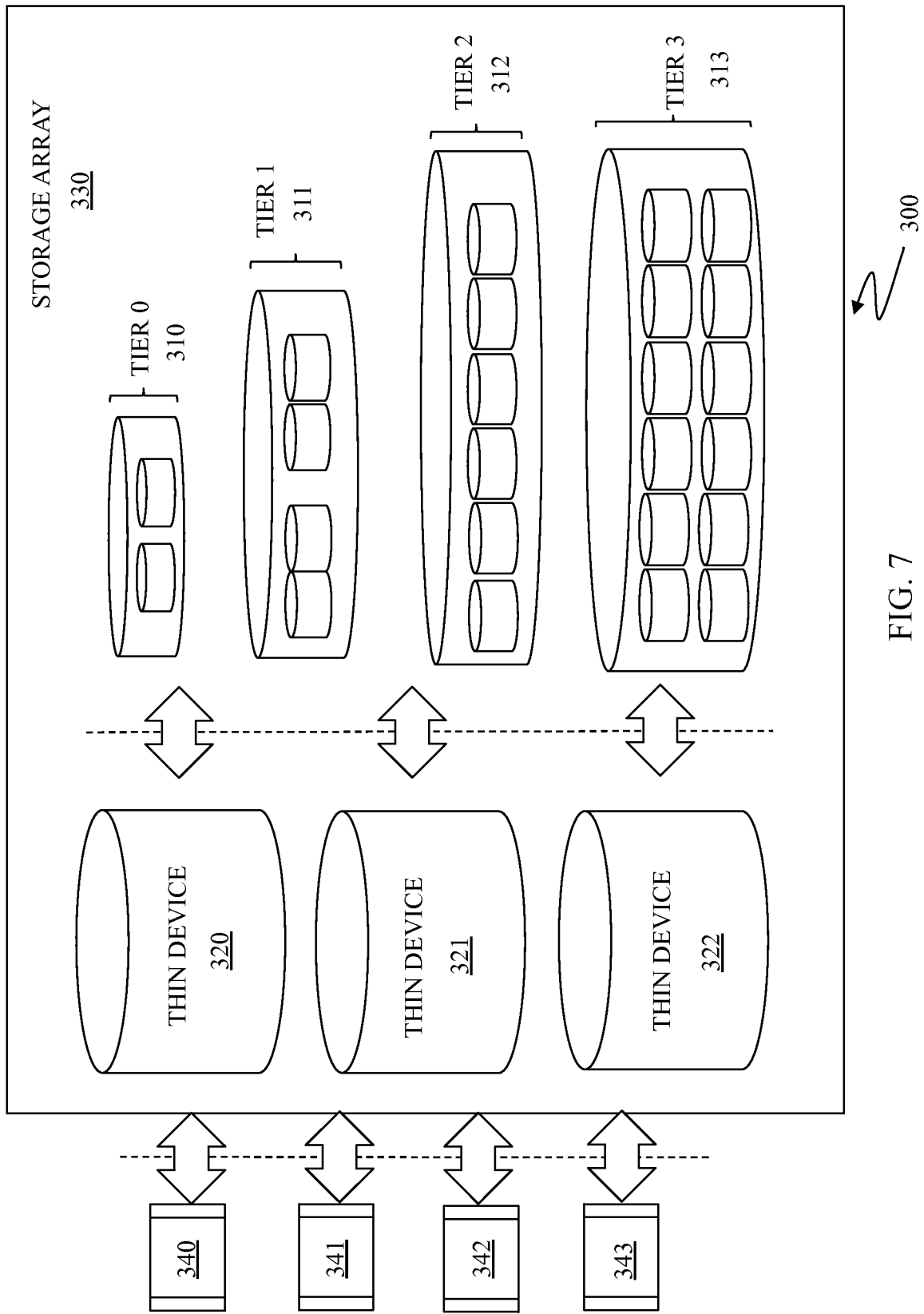
FIG. 7 is a schematic illustration showing a fine grained tiered storage array according to an embodiment of the system described herein.

FIG. 7 is a schematic illustration 300 showing a fine grained tiered storage array 330 according to an embodiment of the system described herein. As illustrated, the storage array 330 includes multiple thin devices 320-322 and multiple pools of storage in multiple storage tiers 310-313. Hosts and/or applications 340-344 and/or other entities (e.g., other storage devices, SAN switches, etc.) request data writes and data reads to and from the storage array 330. In various embodiments, multiple host applications 340-344 may share a single one of thin devices 320-322 and/or multiple thin devices 320-322 may be mapped to the same set of storage pools 310-313.

In an embodiment herein, a write target policy may be applied to data that is being written according to the system described herein. For example, data that is expected to be used frequently, for example database indices, may be initially written directly to fast storage (e.g., tier 0 flash/SSD storage) whereas data that is not expected to be accessed frequently, for example backup or archived data, may be initially written to slower storage devices (e.g., tier 4 MAID or external storage). In this manner, data is efficiently stored by targeting the write to storage areas and devices according to the estimated or expected access frequency of the data, beginning with the initial write of the data and also applying to subsequent data writes that jump across multiple tiers.

The process for determining the appropriate target storage location of the write of the data may be made based on the logical unit number (LUN) ID of the device from which the data is being written, where the storage array 330 may have or obtain information about the types of data stored on specific logical units. Alternatively, additional policies and capabilities may be enabled by adding host-resident "extension" software, for example to tag I/O requests with information about the requesting application or user so that the determination may be made based on other information provided by the host and/or entity accessing the storage array 330 (e.g., a target policy indicator provided with each write or class of writes). Other possible criteria include the time of day, the size of the incoming write operation (e.g. very large sequential writes vs. smaller random writes), file name, file type, host OS type, data type, access patterns, inter-dependent accesses to other data, etc. It is also possible that "hints" from the host could also be used, particularly relating to performance and availability requirements of the data, etc.

The system described herein may include autonomic promotion and demotion policies to facilitate optimization of performance, storage availability and power. For example, a least recently used (LRU) policy may be used to demote data blocks in order to pro-actively make room for new writes of data blocks and/or promotions of data blocks within the system. A most frequently used (MRU) policy may be used to promote data blocks that are frequently used to faster storage tiers. Predictive policies may be used to recognize that data blocks that will be needed before they are actually needed and promote the data blocks accordingly (for example, nightly batch jobs, etc.). Alternatively, the system described herein may include an application programming interface (API) that allows a hosts/users/applications to inform the storage that certain blocks should be promoted or demoted to different tiers.

Other special purpose policies may also be used. As discussed elsewhere herein, mirroring of data blocks across multiple tiers may be used. For example, for frequently used data blocks, one copy may be written to flash/SSD memory at a top storage tier and a second copy mirrored to another storage tier (e.g., tier 3 or tier 4). Another policy may include promoting and/or demoting a data block, but not deleting the data block from its pre-promoted or demoted location until the data block is modified. This policy offers advantages including when subsequently demoting the block (if unmodified), a copy may already exist on a slower storage tier and an additional copy does not need to be made (only the copy on the faster storage tier deleted). When a data block is modified, the previous copy on a different storage tier may be deleted.

Other policies may include manual or automatic pre-promotion and post-demotion policies. For example, blocks may be promoted in the background immediately before batch runs (e.g., billing runs etc.). Additionally, writes, for such processes as back-ups, may required the fastest possible write, but never (or only infrequently) read. In this case, writes may be written to a top storage tier and immediately scheduled for demotion to a lower storage tier. With MAID storage, data blocks rarely or never used may be consolidated onto individual spindles that may then be powered off, providing a reduction in power consumption for storage of data blocks infrequently accessed. Further, sequential/contiguous blocks may be coalesced and relocated in an optimization process that may include other advanced strategies, including aligning indices near to data being indexed. It is also possible to have a de-duplication policy in which nothing is deleted from storage in a de-dup tier. Data blocks in storage pools of a de-dup storage tier may be promoted to fast storage tiers as needed, but block and index/metadata in the de-dup storage may be maintained even if a data block is promoted to a faster storage tier and modified or deleted. Maintenance of de-dup storage tiers may involve "use counters" and/other mechanisms that may be used with known data cleaning processes such as garbage collection, etc.

Distributed/remote replication systems, such as RDF and/or other types of mirroring/replication systems, may be used to enable site failover in support of disaster recovery processes and/or business continuance processes, among other support reasons. However, the mere replicating of data across the primary (R1) and secondary (R2) devices may not provide for sufficient failover capability between the R1 and R2 devices in cases where tiering at a finer granularity than the LUN, device or other volume (collectively referred to as a "device") is used and where subsets of a given device are stored on different tiers of storage based on, for example, application performance, request or usage patterns. When the R1 device and the R2 device both use a fully-automated storage tiering system (FAST) (e.g., a fine grained tiered storage (FGTS) system), the R2 device may not be aware of the workload seen by the primary R1 device and, accordingly, may not have the information necessary to tier the data in the same fashion as the R1 device. In such a case, the R2 device may not be able to adequately support the primary site workload in a failover because the mirrored data at the R2 device may not be as efficiently or effectively managed (e.g., storage tiered) to support the primary site workload.

One possible solution to the above-noted issue is to reflect all fully-automated storage tiering block-relocation decisions made at the primary R1 device over to the secondary R2 device. However, the additional information needed for such a solution may be so large as to require be impractical in many situations. Further, such a solution may not be effective in cases where the primary R1 device and the secondary R2 device are not identically configured. Accordingly, the system described herein provides for a more practical and efficient approach to providing the R2 device with sufficient information to characterize the tiering of data stored thereon in a similar manner to the data tiering on the R1 device such that, in the event of failover, the R2 device may adequately assume the workload that was being supported by the primary R1 device.

In an embodiment, the system described herein provides for the use of a data summarization and/or characterization approach to synchronize data layouts and resource utilizations at one or more remote replica sites with the workload and tiering decisions being made at the primary site. Raw data access information about the workload of the primary R1 device is collected at the R1 device. The raw data access information may include, for example, data access and/or usage information about the data stored on the R1 device, including information collected about each access and/or use of data, among other access and/or usage characteristics, as further discussed elsewhere herein. The raw data access information may be characterized, condensed and/or relevant information may be encapsulated therefrom about the workload of the primary R1 device into access pattern information concerning the stored data. The access pattern information may include statistical information concerning access rates of data, frequency of use of data, a time of last use of data, source/requestor information of the data, and/or other statistics of the raw data access information over a period of time. In this way, the access pattern information of the workload at the primary R1 device may be sent periodically to the secondary R2 device, but less frequently, and with less total information, than for every block-relocation decision made at the primary R1 device. As further discussed elsewhere herein, in various embodiments, the access pattern information may be generated and transmitted at the application level, that is, by a host or application that is operating in connection with the primary R1 device in connection with data replication processing.

The frequency with which the data access pattern information may be collected and transmitted to the R2 device may be variably controlled and/or determined according to the specific requirements of a particular system or industry. Specifically, raw data access information may be collected and access pattern information generated and transmitted according to the access rates of the data over time, for example, different frequencies of collection, generation and transmission based on different access rates of the data over minutes, hours, days, etc. Other mechanisms may be used for determining the frequency of collection of raw data access information and the generation and transmission of the access pattern information in accordance with the system described herein.

Figure 8:
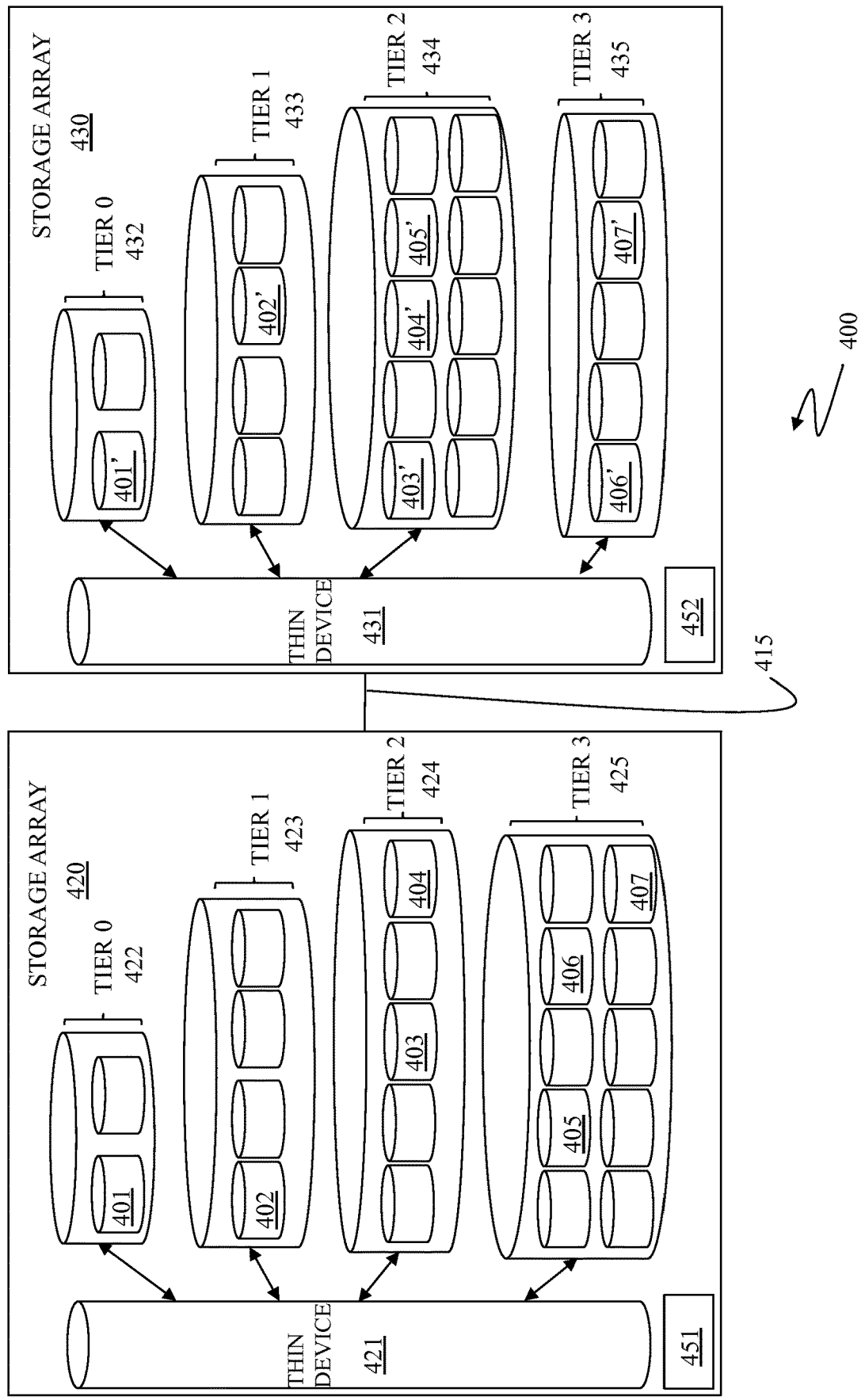
FIG. 8 is a schematic illustration showing use of multiple storage arrays connected via the link and that may be part of a distributed/remote data replication system, for example, communicating as primary R1 and secondary R2 device systems, as according to an embodiment of the system described herein.

FIG. 8 is a schematic illustration 400 showing use of multiple storage arrays 420, 430 connected via the link 415 and that may be part of a distributed/remote data replication system, for example, communicating as primary R1 and secondary R2 device systems, as according to an embodiment of the system described herein. The storage arrays 420, 430 may each include one or more storage devices, having components like that of the storage device 30 discussed elsewhere herein, and it should be noted that, as discussed elsewhere herein and as illustrated in the figure, the storage arrays 420, 430 may not be identical and may have different configurations and/or capabilities. The storage array 420 is shown including a thin device 421 coupled to multiple storage tiers 422 (tier 0), 423 (tier 1), 424 (tier 2), 425 (tier 3) having different storage features and/or characteristics. The thin device 421 may map to different storage areas (or devices) across the multiple storage tiers, as further discussed elsewhere herein. For example, in the illustrated embodiment, and as further discussed elsewhere herein, the thin device 421 may map blocks of data to storage areas (or devices) such as a storage area 401 in the pool of storage of the top storage tier 422 (tier 0), a storage area 402 in the pool of storage of the next storage tier 423 (tier 1), storage areas 403, 404 in the pool of storage of the next storage tier 424 (tier 2), and storage areas 405, 406 and 407 in the pool of storage of the next storage tier 425 (tier 3).

The storage array 420 may further include a data access information collector/controller 451 that may monitor and collect data access information concerning the data workload at the storage device 420 acting as the primary device. It should be noted that, in various embodiments, the data access information collector/controller 451 may be a software module stored on the storage array 420 and/or may be located externally to the storage array 420 and coupled thereto, among other suitable configurations. The data access information collector/controller 451 may generate, from the raw collected data access information, the access pattern information including characterizing statistics of data access, as further discussed elsewhere herein. The access pattern information may be smaller in size and/or contain less information than the raw collected data access information. The access pattern information may be transmitted to the storage device 430 acting as the secondary device for processing thereon, as further discussed elsewhere herein.

The storage array 430 is shown including a thin device 431 coupled to multiple storage tiers 432 (tier 0), 433 (tier 1), 434 (tier 2), 435 (tier 3) having different storage features and characteristics, as further discussed elsewhere herein. The thin device 431 may map to different storage areas (or devices) across the multiple tiers. The storage array 430 acts the secondary device by providing data replication and/or mirroring functionality. Data areas 401', 402', 403', 404', 405', 406', 407' in the storage array 430 contain data corresponding to the data contained within the data areas 401-407 of the storage array 420. The corresponding data of the data areas 401'-407' is associated with the data stored in the data areas 401-407 of the storage array 420 and, for example, may be a exact copy of the data stored in the data areas 401-407 of the storage array 420 and/or may be a somewhat earlier version of the data stored in the data areas 401-407 according to the frequency of data replication of the RDF system.

The data in the data areas 401'-407' may be subject to data tiering according to the access pattern information received by the storage device 430 concerning the primary workload at the primary device (the storage array 420). The storage array 430 may include a receiver/controller 452 that receives the access pattern information about the primary device and controls the use of the access pattern information for management of the replicated data on the storage device 430 as the secondary device. It should be noted that, in various embodiments, the receiver/controller 452 may be a software module stored on the storage device 430 and/or may be located externally to the storage device 430 and coupled thereto, among other suitable configurations.

The storage array 430 is shown as having a different storage configuration than the storage array 420. Further, the result of data tiering the replicated data from the storage array 420 based on the access pattern information is illustrated as not being identical to the data tiering on the storage device 420. For example, the data of data area 405 on the storage array 420 is shown as being stored in the storage tier 425 (tier 3) of the storage array 420 (primary device); however, the data of data area 405' on the storage array 430 corresponding to the data of data area 405 is shown as being stored in the storage tier 434 (tier 2) of the storage array 430 (secondary device). That is, the data tiering on the storage array 430 using the access pattern information has resulted in the storing of the data of data area 405' of the storage array 430 on a different storage tier (storage tier 434) than the equivalent storage tier (storage tier 425) on the storage array 420 in accordance with the storage functionality of storage array 430. It is noted, however, that in accordance with the system described herein, the data tiering on the storage array 430 (the secondary device) is such that the storage array 430 is capable of quickly assuming the primary workload that is currently being supported by the storage array 420 (the primary device). Accordingly, the access pattern information transmitted to the storage array 430 allows the storage array 430 to make its own independent decisions on how best to utilize its available resources to match the performance requirements currently being supported by the storage array 420.

Figure 9:
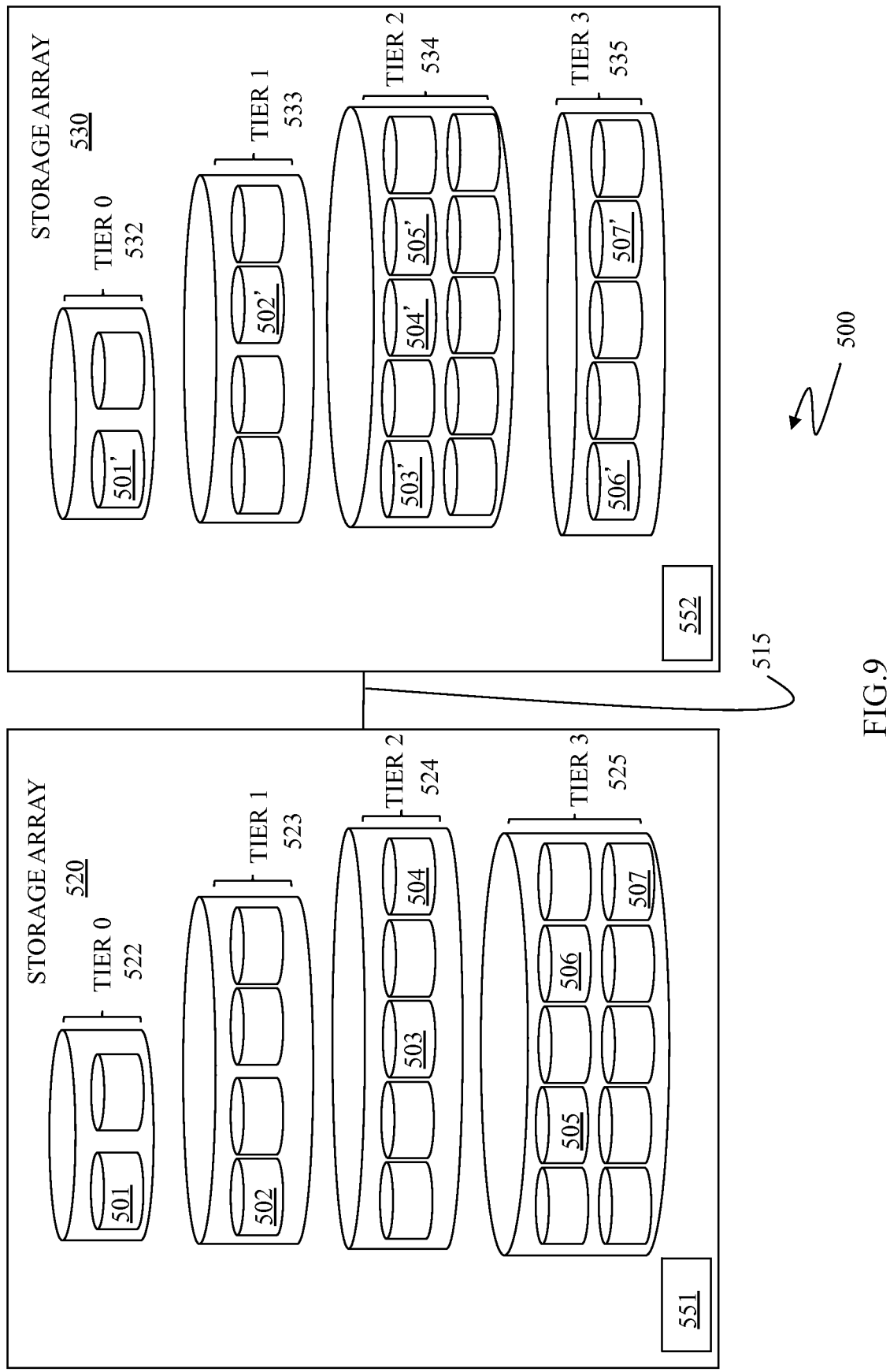
FIG. 9 is a schematic illustration of another embodiment with multiple storage arrays connected via a link and communicating as part of a distributed/remote data replication system according to an embodiment of the system described herein.

FIG. 9 is a schematic illustration 500 of another embodiment with multiple storage arrays 520, 530 connected via a link 515 and communicating as part of a distributed/remote data replication system according to an embodiment of the system described herein. The storage arrays 520, 530 do not include thin devices, but do use a data storage tiering scheme like that of the storage illustration 400, discussed above. Similar to the illustration 400, the storage array 520 may include tiers 0-3 521-524 shown with data in data areas 501-507, and the storage array 530 may include tiers 0-3 531-534 shown with data in data areas 501' to 507'. Thus, the storage array 520 may include a data access information collector/controller 551 and the storage array 530 may include a receiver/controller 552, like the similar components discussed above. The storage array 530 may have a different storage configuration than the storage array 520. Further, the result of data tiering the replicated data from the storage array 530 based on the access pattern information is illustrated as not being identical to the data tiering on the storage array 520. Just as with the storage devices 420, 430, discussed above, the access pattern information transmitted to the storage array 530 allows the storage array 530 to make its own independent decisions on how best to utilize its available resources to match the performance requirements currently being supported by the storage device 520.

Figure 10:
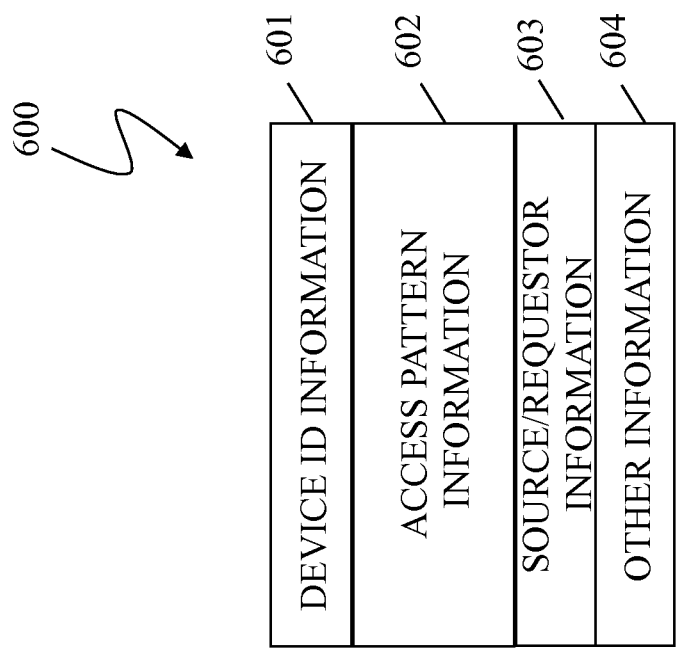
FIG. 10 is a schematic illustration showing an access pattern information element that may be generated and transmitted from a primary storage array, like that of storage arrays to the secondary storage array, like that of storage arrays in accordance with an embodiment of the system described herein.

FIG. 10 is a schematic illustration showing an access pattern information element 600 that may be generated and transmitted from a primary storage array, like that of storage arrays 420, 520 to the secondary storage array, like that of storage arrays 430, 530, in accordance with an embodiment of the system described herein. The access pattern information element 600 may be the result of characterizing and/or otherwise condensing raw data access information collected concerning data access workload supported by the primary storage array. The access pattern information may be smaller in size and/or contain less information than the raw data access information. The element 600 may include a plurality of entries 601-604.

In an embodiment, the entry 601 may include device identification information identifying the device that is the subject of the access pattern information. The entry 602 may include various types of access pattern information. For example, the entry 602 may include data access pattern information concerning data access rate information, time of last access, and/or other request pattern information that statistically characterizes the data access workload supported on the primary storage array. Additionally, the access pattern information of the entry 602 may include data usage patterns, including, for example, information with respect to application performance and usage requirements and/or other data usage pattern information that statistically characterizes data usage workload supported on the primary storage array. The entry 603 may include source/requestor information that identifies the requesting source of the information. For example, data for use by a particular device, such as an ATM, may indicate higher storage tiering requirements for the data, regardless of actual access rate of the data, and/or a request by a particular individual may indicate that storage of the data should be on a higher tier of storage than is normally required. Other suitable source/requestor information may be used in connection with the system described herein. The entry 604 may contain other information, for example, the time since the last access pattern information was sent. Additional information may be contained within the access pattern information element 600 concerning statistics about data access information of the workload supported on the primary storage array for use in connection with the system described herein and/or only certain of the above-noted entries may be included in the access pattern information element 600. Of course, the data access information element 600 may contain different information than that illustrated in FIG. 10.

The system described herein provides for minimizing the amount of raw data access information that has to be transmitted from the primary storage array to the secondary storage array. The access pattern information transmitted to the secondary storage array allows an R2 device to operate according to a fully-automated storage tiering system that is independent from the storage tiering system of the R1 device of the primary storage array but sufficient to handle the workload of the primary site in the event of failover. Specifically, each remote storage device may make its own independent decisions on how best to utilize the available resources to match the performance requirements currently being supported by the primary site. It should be noted then that, with the access pattern information, the R2 device may utilize the same or different tiered storage configurations than the primary R1 device, but in a way that is sufficient to handle the workload that the R1 device is supporting. Reference is made to U.S. patent application Ser. No. 12/319,122 to Burke et al., filed Dec. 31, 2008, entitled "Synchronizing Performance Requirements Across Multiple Storage Platforms," which is incorporated herein by reference.

In some situations, a customer may decide to control replication at the host or application level. In such situations, access pattern information concerning replicated data may not be transmitted among the storage arrays, particularly in cases where storage layout configuration software is different or configured differently among the storage arrays. According to embodiments of the system described herein, access pattern information may be imported and exported by the host or application that is controlling host based replication among storage arrays, as further discussed in detail herein.

Figure 11:
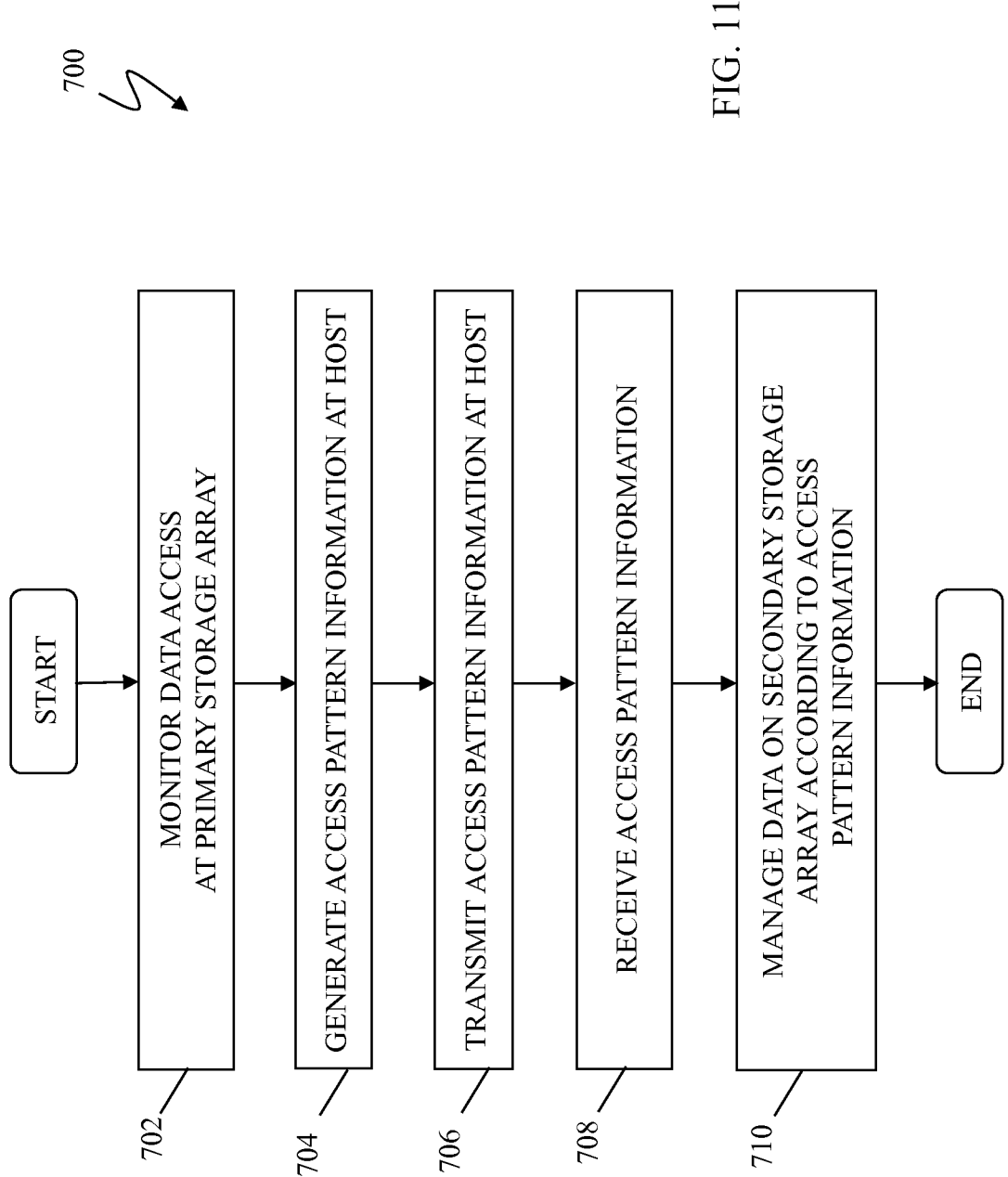
FIG. 11 is a flow diagram showing a process for generating and transmitting access pattern information from a primary storage array or array to a secondary storage array or array according to an embodiment of the system described herein.

FIG. 11 is a flow diagram 700 showing a process for generating and transmitting access pattern information from a primary storage array or array to a secondary storage array or array according to an embodiment of the system described herein. At a step 702, accesses of data on the primary storage array are monitored. As further discussed elsewhere herein, the data access may be monitored according to the particular use and/or access of data on the primary storage array and may be collected based on application performance, request or usage patterns, and/or other characteristics at the primary site. Data access information may include information about data reads and writes. The data access may be monitored by one or more hosts and/or applications operating in connection with the primary storage array.

After the step 702, processing proceeds to a step 704 where information of the monitored data accesses is characterized, and/or otherwise condensed and relevant information therefrom encapsulated, to generate access pattern information that may include, for example, statistics about the data access workload on the primary storage array, for example, rate and frequency of how the data is being access on the primary storage array. The statistics of the access pattern information may be tabulated information generated from the data access information over a determined period of time or based on another metric that statistically quantifies data access patterns and/or other characteristics at the primary storage array, as further discussed elsewhere herein. As further discussed elsewhere herein, the access pattern information may be generated and transmitted by a host or application operating in connection with the primary storage array.

After the step 704, processing proceeds a step 706 where the access pattern information is transmitted to the secondary storage array that may be located remotely from the primary storage array. It may be noted that transfer of the access pattern information may be performed independently from or concurrently with the data replication processing (e.g. RDF processing) that occurs between the primary and secondary storage arrays. After the step 706, processing proceeds to a step 708 where the secondary storage array receives the access pattern information. After the step 708, processing proceeds to a step 710 where the secondary storage array manages the data on the secondary storage array by applying an ILM algorithm, as further discussed elsewhere herein, to storage tier data on the secondary storage array according to the access pattern information and based on the storage resources and/or capabilities of the secondary storage array. Accordingly, the storage tiering on the secondary storage array may be sufficient to handle the workload requirements that are being supported on the primary storage array. After step 710, processing is complete. The system described herein thereby enables host/application level coordination based on access patterns of data between the primary storage array and the secondary storage array to which data is being replicated. The system described herein may be automatically implemented using executable code stored on a computer readable medium and executable by a processor of one or more of the hosts and/or directors.

Figure 12:
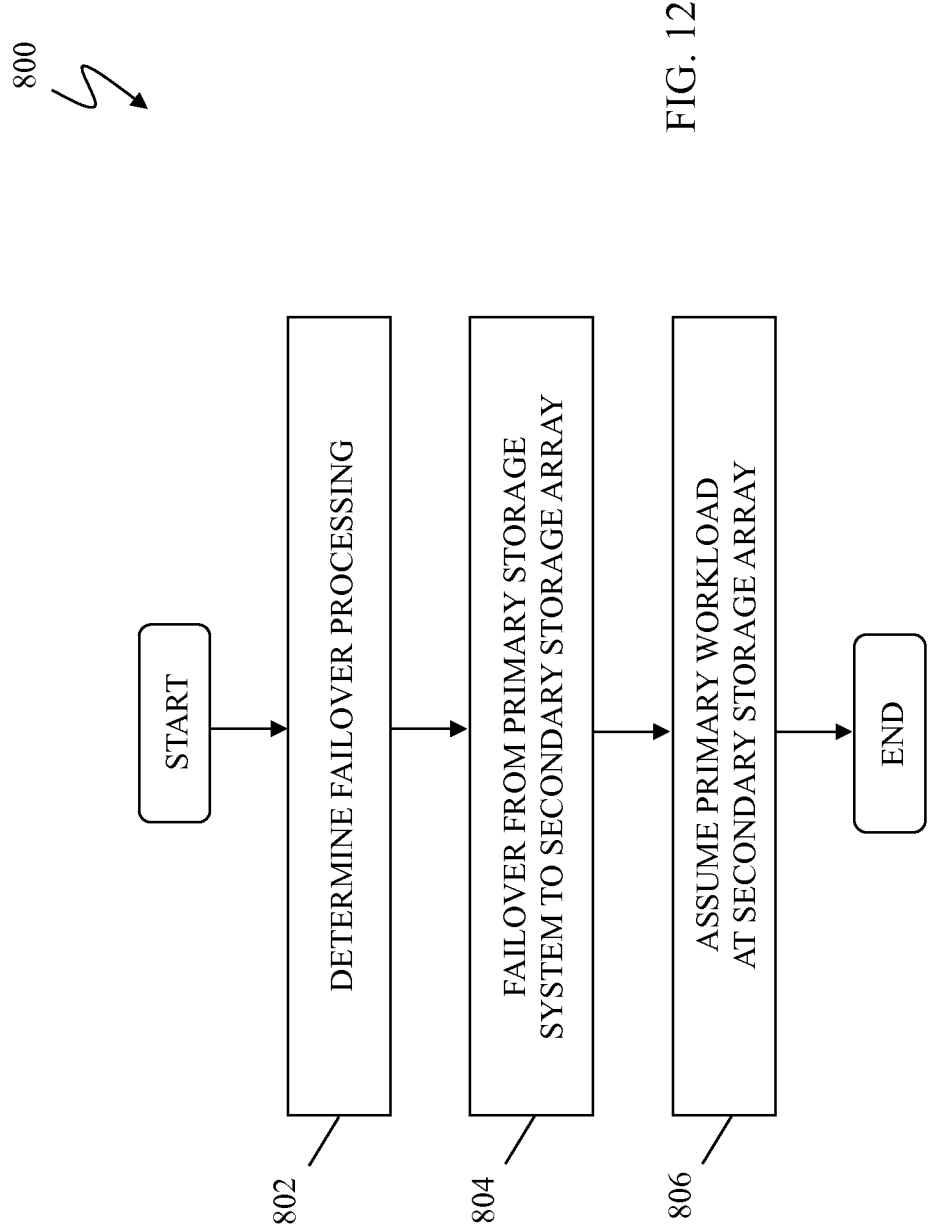
FIG. 12 is a flow diagram showing a process of failover from a primary storage array to a secondary storage array that has undergone fully-automated storage tiering processing, as further discussed elsewhere herein, based on the access pattern information received about the data access workload on the primary storage array according to an embodiment of the system described herein.

FIG. 12 is a flow diagram 800 showing a process of failover from a primary storage array to a secondary storage array that has undergone fully-automated storage tiering processing, as further discussed elsewhere herein, based on the access pattern information received about the data access workload on the primary storage array according to an embodiment of the system described herein. At a step 802, it is determined that primary workload processing is to failover from the primary storage array to the secondary storage array. For example, failover from the primary storage array to the second storage array may occur in accordance with disaster recovery processing and/or business continuance processing, among other reasons.

After the step 802, processing proceeds to a step 804 where failover from the primary storage array to the secondary storage array occurs. After the step 804, processing proceeds to a step 806 where the secondary storage array assumes workload processing as the primary device. According to the system described herein, the secondary storage array may assume workload processing as the primary storage array almost immediately because data tiering has occurred on the secondary storage array that reflects the workload processing previously supported on the primary storage array on the basis of the access pattern information previously, e.g., periodically, provided to the secondary storage array. After step 806, processing is complete.

A product of EMC Corporation of Hopkinton, Mass., called FAST VP (Fully Automated Storage Tiering in Virtual Pools) is an automated process to optimize data layout on a multi-storage tier system based on an access pattern of data stored on the multi-storage tier system. In a federated environment (e.g., in various customer data centers) there may be many individual storage arrays that are being used for remote application. Customers may replicate data between the arrays that are each being independently managed by a FAST VP product and/or by a different layout management software product. In some cases, despite the independent layout management by the layout management software at the sites, the customers may desire that the data layout across the multiple storage tiers in the multiple storage arrays or arrays be similar in order to get similar performance in the case of failover from one (primary) site to a remote (secondary) site.

Figure 13:
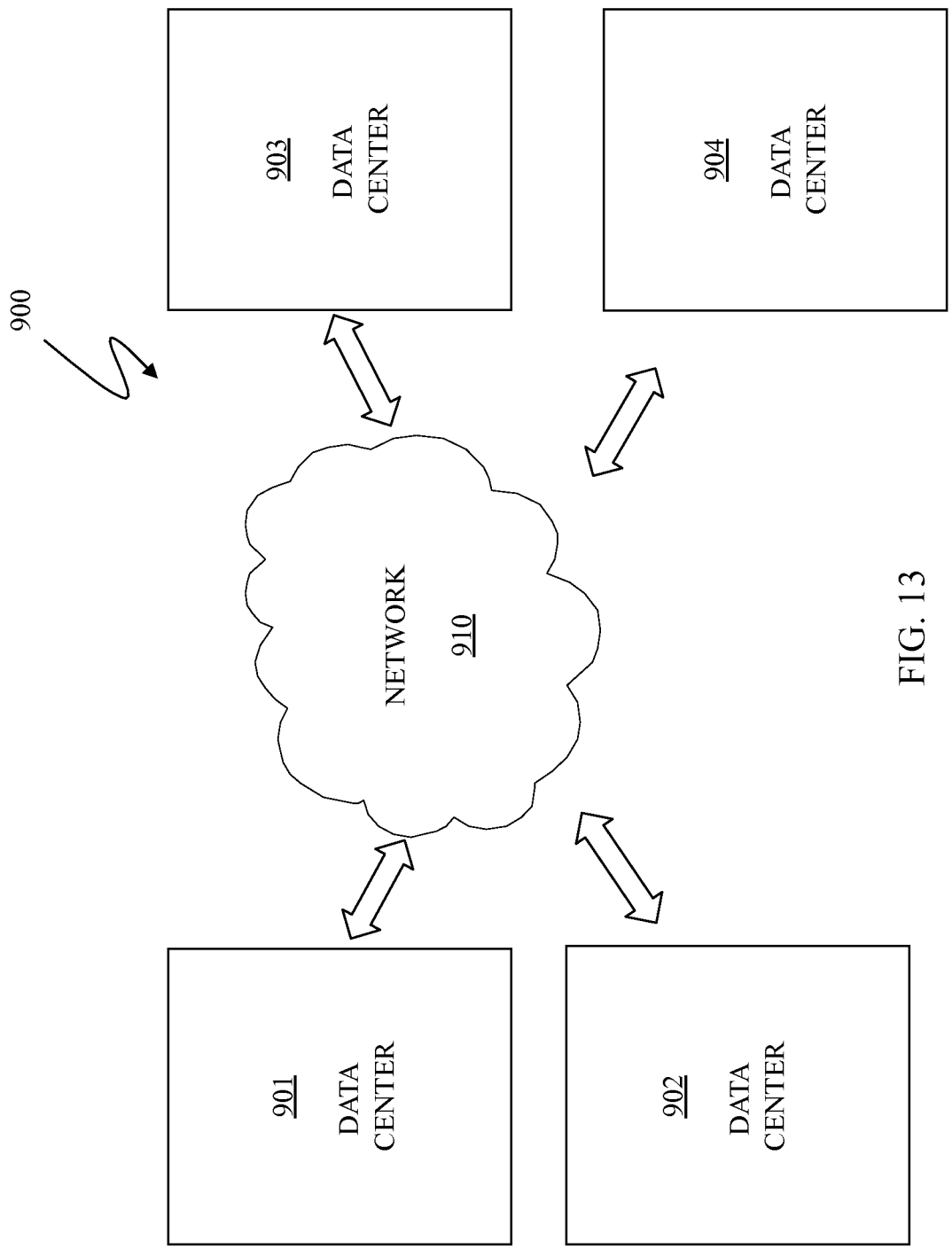
FIG. 13 is a schematic illustration showing a federated environment that includes data centers in communication with each other that may be used in accordance with an embodiment of the system described herein.

FIG. 13 is a schematic illustration showing a federated environment 900 that includes data centers 901-904 in communication with each other that may be used in accordance with an embodiment of the system described herein. Although embodiments are discussed principally in connection with data centers 901-904 any number of additional data centers may be also be used in connection with the system described herein. Each of the data centers 901-904 may include a plurality of storage arrays and/or devices for executing applications using one or more virtual machines (VMs) and which may be controlled and/or managed in connection with one or more virtual centers and virtual data centers among the data centers 901-904. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 901-904 may contain any number of processors and storage arrays and/or devices that are configured to provide the functionality described herein. In an embodiment herein, the storage arrays may include Symmetrix storage arrays provided by EMC Corporation of Hopkinton, Mass. Other appropriate types of storage arrays may also be used in connection with the system described herein that include features and components of storage arrays like that discussed in detail elsewhere herein. The data centers 901-904 may be configured similarly to each other or may be configured differently. The network 910 may be any network or similar mechanism allowing data communication between the data centers 901-904. In an embodiment herein, the network 910 may be the Internet and/or any other appropriate network and each of the data centers 901-904 may be coupled thereto using any appropriate mechanism. In other embodiments, the network 910 may represent a direct connection (e.g., a physical connection) between the data centers 901-904.

In various embodiments, VMs may be migrated from a source one of the data centers 901-904 to a destination one of the data centers 901-904. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference.

Figure 14:
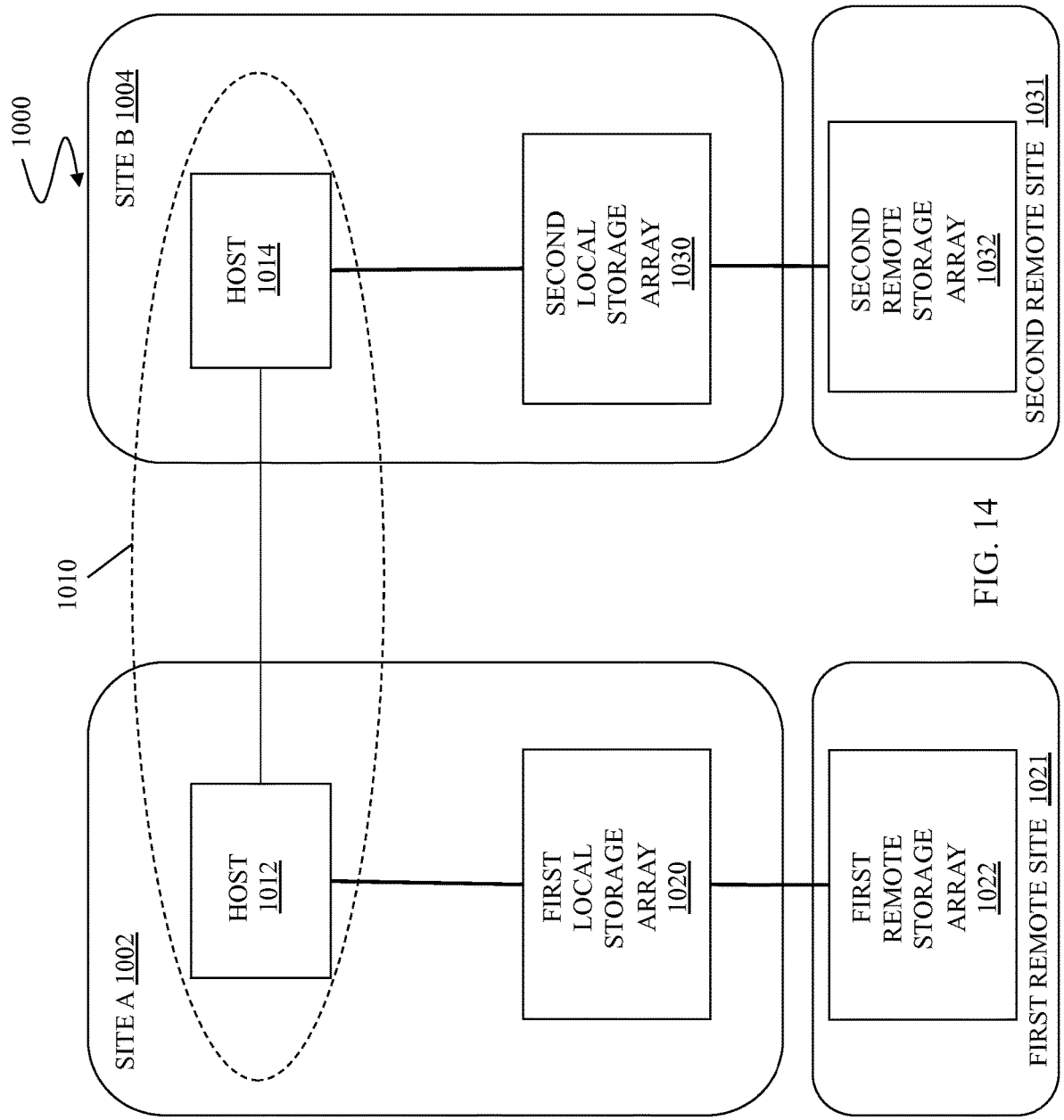
FIG. 14 is a schematic illustration of a more detailed view of a host based replication system involving multiple sites according to an embodiment of the system described herein.

FIG. 14 is a schematic illustration of a more detailed view of a host based replication system 1000 involving multiple sites according to an embodiment of the system described herein. The system 1000 may include a Site A 1002 and a Site B 1004. The Site A 1002 and Site B 1004 may be different sites, but may not necessarily be located geographically distant from each other. A first local storage array (array) 1020 is provided at Site A 1002 and a second local storage array (array) 1030 is provided at Site B 1004 (e.g. R1 devices). A plurality of hosts 1012, 1014 may be coupled to the first local storage array 1020 and the second local storage array 1030 to conduct read and write operations from and to the local storage arrays 1020, 1030. In an embodiment, the system 1000 provides for remote mirroring where multiple storage volumes, e.g., a first local storage device 1020 and a second local storage device 1030, may be active at the same time.

In various embodiments, the plurality of hosts 1012, 1014 may be coupled to the storage arrays 1020, 1030 directly and/or via a network, such as the Internet, an intranet and/or other suitable network connection. The hosts 1012, 1014 may be part of a cluster 1010, which may be formed by a group of hosts and/or applications connected together, for example, via a local area network and/or other network. In various embodiments, the first and second local storage arrays 1020, 1030 may include separate devices, volumes, and/or portions thereof, and may include physical devices and/or logical volumes, for example, identified as Logical Unit Numbers (LUNs).

A first remote site 1021 may include a first remote storage array 1022 (e.g., R2) that may be coupled via an asynchronous data transfer link to the first local storage array 1020 (e.g., R1) on Site A 1002. A second remote site 1031 may include a second remote storage array 1032 (e.g., R2) that is coupled via an asynchronous data transfer link to the second local storage array 1030 (e.g., R1) on Site B 1004. The data transfer links may be direct connections and/or connections over a network, such as the Internet, an intranet and/or other suitable network connection. One or more of the hosts 1012, 1014 may control the synchronization of local data copies across the first local storage device 1020 and the second local storage device 1030. Thereafter, data from each of the first local storage device 1020 and the second local storage device 1030 may be asynchronously transferred to the respective remote storage arrays 1022, 1032 of the first and second remote sites 1021, 1031, as further discussed elsewhere herein. It is further noted that, as discussed elsewhere herein, embodiments of the system described herein may be provided in which there are synchronous data transfer links between the local and remote storage arrays, where appropriate. For description of other host based replication systems and techniques, reference is made, for example, to U.S. patent application Ser. No. 13/338,719 to LeCrone et al, filed Dec. 28, 2011, and entitled "Four Site Data Replication Using Host Based Active/Active Model," which is incorporated herein by reference.

In various embodiments, a host, or application running on the host, such as the host 1012, may control data replication among storage arrays, such as data mirroring between primary and secondary storage arrays or systems. According to the system described herein, the host or application may generate access pattern information for the data that is being replicated. In an embodiment, the access pattern information may provide information corresponding to how the data being replicated has been accessed. For example, the data may characterize information as the rate and/or frequency with which the has been accessed on the primary storage array. In an embodiment, the application or host 1012 may then transmit the access pattern information along with the replicated data from the primary storage array (e.g., first storage array 1020) to the secondary storage array (e.g., first remote storage array 1022).

At the secondary storage array, the received replicated data from the primary storage array may be stored on the secondary storage array based on the access pattern information also received. For example, in connection with the secondary storage array having multiple storage tiers (storage tiers that may be similar to or different from tiers of the primary storage array), the access pattern information may be used to store the replicated data on one or more of the storage tiers of the secondary storage device. For example, data accessed frequently at the primary storage array may be stored on a performance tier (e.g., tier 0) of the secondary storage array.

Figure 15:
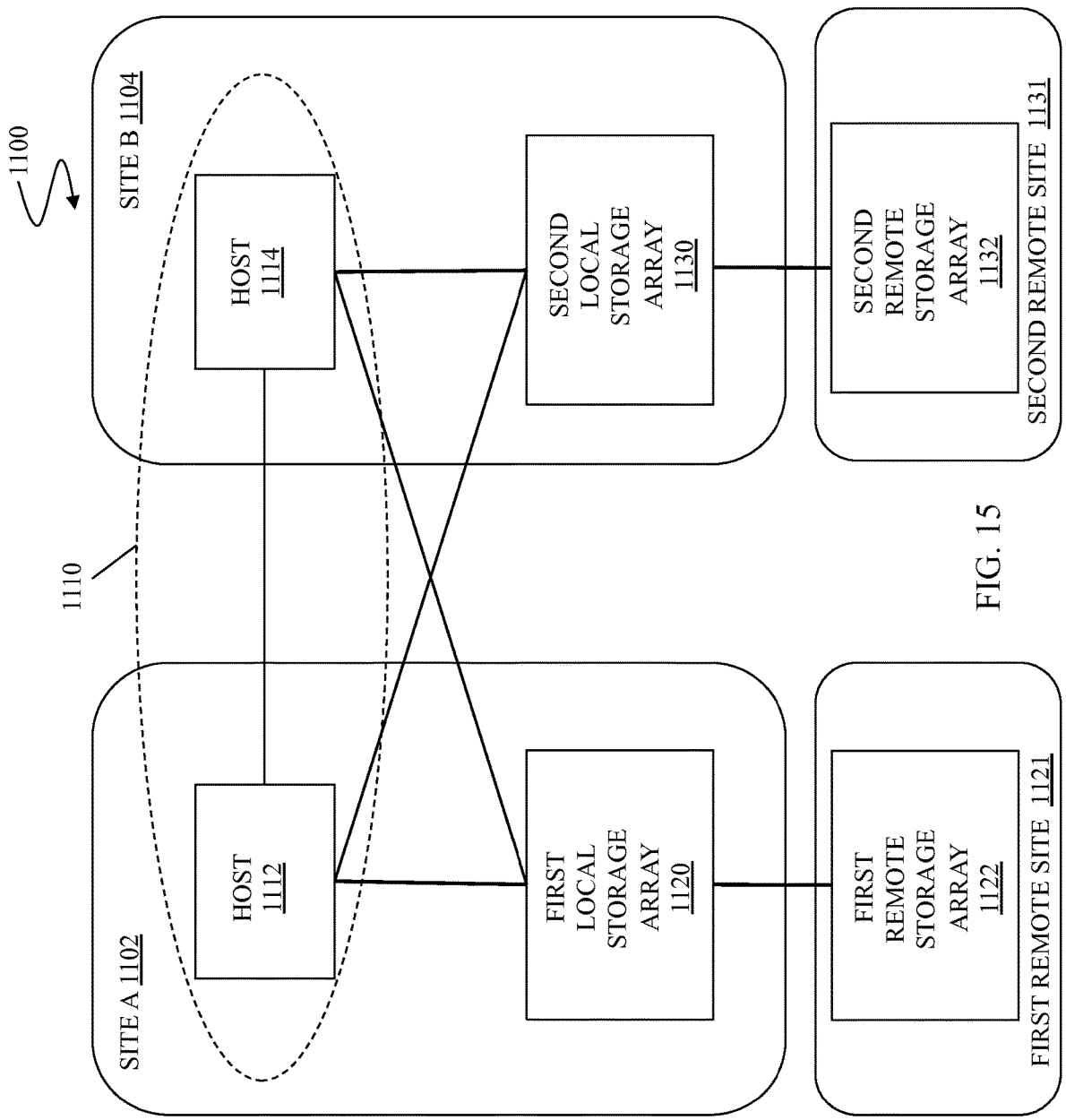
FIG. 15 is a schematic illustration showing another embodiment of a host based replication system shown having site A and site B in which one or more hosts of a host cluster may be coupled to and operate in connection with one or more of the local storage arrays according to an embodiment of the system described herein.

FIG. 15 is a schematic illustration showing another embodiment of a host based replication system 1100 shown having site A 1102 and site B 1104 in which one or more hosts 1112, 1114 of a host cluster 1110 may be coupled to and operate in connection with one or more of the local storage arrays 1120, 1130 according to an embodiment of the system described herein. Similar to the description of components of the host based replication system 1000, the host based replication system 1100 of this illustration may include first and second remote sites 1121, 1131 with first and second remote systems 1121, 1131. The host based replication system 1100 may operate similarly to the host based replication system 1000, but in which, as illustrated, any one of the hosts 1112, 1114 of the host cluster 1110 may interface with either of the sites A, B 1102, 1104. This embodiment may, accordingly, be suitably used in connection with multiple site (e.g., four site) replication techniques. In connection therewith, for example, the host 1112 may export access pattern information for data being replicated via the first local storage array 1120 to the first remote storage array 1122 and via the second local storage array 1130 to the second remote storage array 1131. In each case, the access pattern information may be used in connection with configuring and/or optimizing the storage layout of the replicated data according to how that data has been accessed on the primary storage array (e.g., first local storage array 1120).

In another embodiment, it is noted that a second application or host 1114 may controls storage of data on the secondary storage array (e.g., second local storage array 1130) and may receive and analyze the access pattern information from the first application or host 1112 of the primary storage array (e.g., first local storage array 1120). Thereafter, the second application or host 1114 may determine the storage configuration in which the received replicated data is stored on the secondary storage array based on the received access pattern information from the first application or host 1112.

Figure 16:
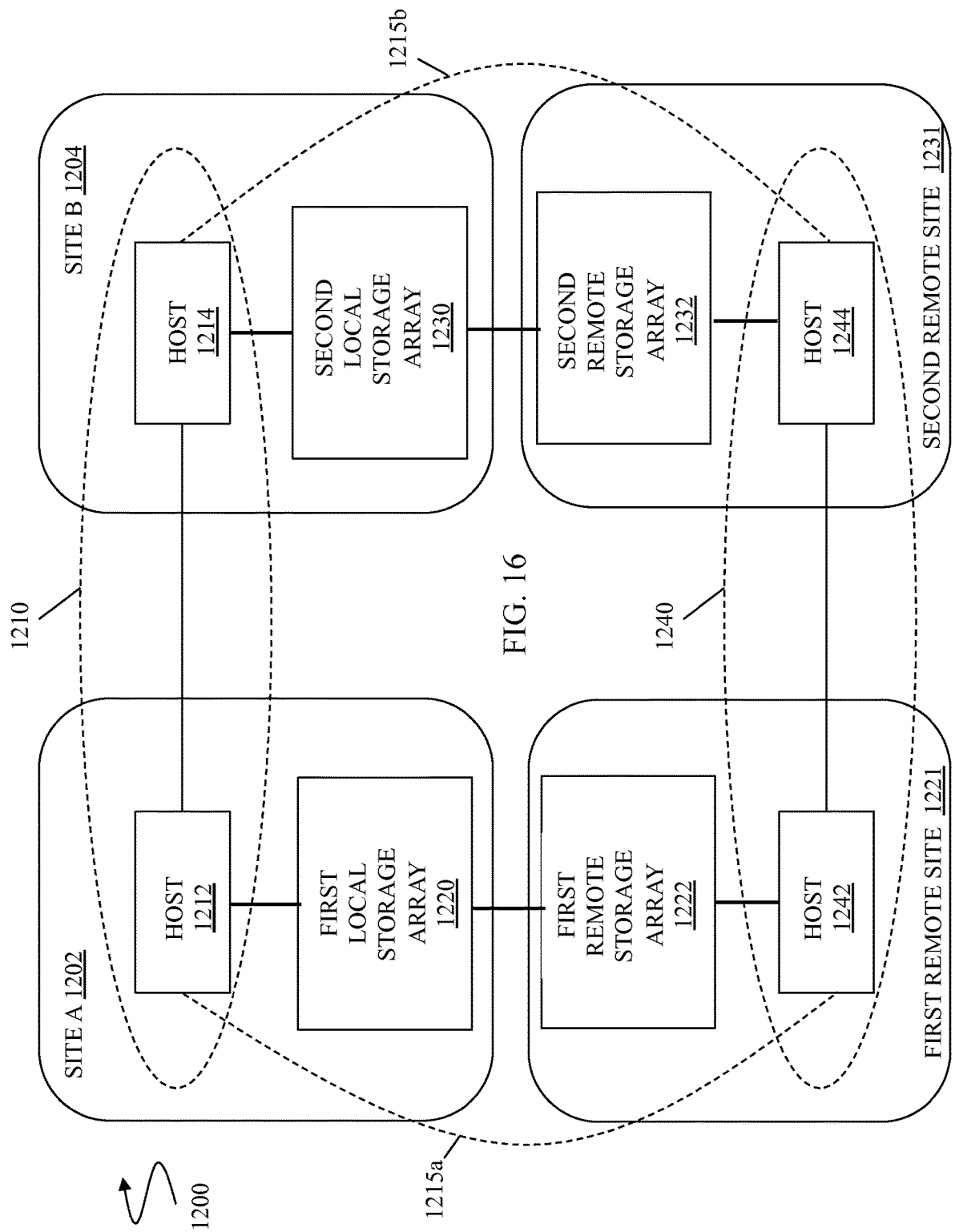
FIG. 16 is a schematic illustration showing host based replication system in connection with active host operations may be performed at the local and the remote storage arrays in connection with active/active system operations according to an embodiment of the system described herein.

FIG. 16 is a schematic illustration showing host based replication system 1200 in connection with active host operations may be performed at the local and the remote storage arrays in connection with active/active system operations according to an embodiment of the system described herein. The host based replication system 1200 shown having site A 1202 and site B 1204 in which one or more hosts 1212, 1214 of a host cluster 1210 may be coupled to and operate in connection with one or more of the local storage arrays 1220, 1230. Similar to the description of components of the host based replication system 1000, the host based replication system 1200 of this illustration may include first and second remote sites 1221, 1231 with first and second remote storage arrays 1221, 1231. Further illustrated are hosts 1242, 1244 that may be part of a host cluster 1240 that may operate in connection with the second remote storage arrays 1221, 1231. In various embodiments, the remote storage arrays 1221, 1231 may be treated as local storage arrays in connection with operations of the hosts 1242, 1244. Accordingly, the system described herein may be used in connection with an active/active system, like that shown for the host based replication system 1200.

In an embodiment, the hosts 1212, 1214 may generate and transmit access pattern information for data stored on one or more of the local storage arrays 1220, 1230 in connection with data being replicated to the remote storage arrays 1221, 1231. Similarly, the hosts 1242, 1244 may generate and transmit access pattern information for data stored on one or more of the remote storage arrays 1221, 1231 in connection with data being replicated to the local storage arrays 1220, 1230 (e.g., active/active operations). In various embodiments, the access pattern information may be transmitted with the data being replicated and/or may be transmitted directly between the hosts 1212, 1214 and the hosts 1242, 1244 which is illustrated by the dashed line transmission paths 1215a, 1215b.

Figure 17:
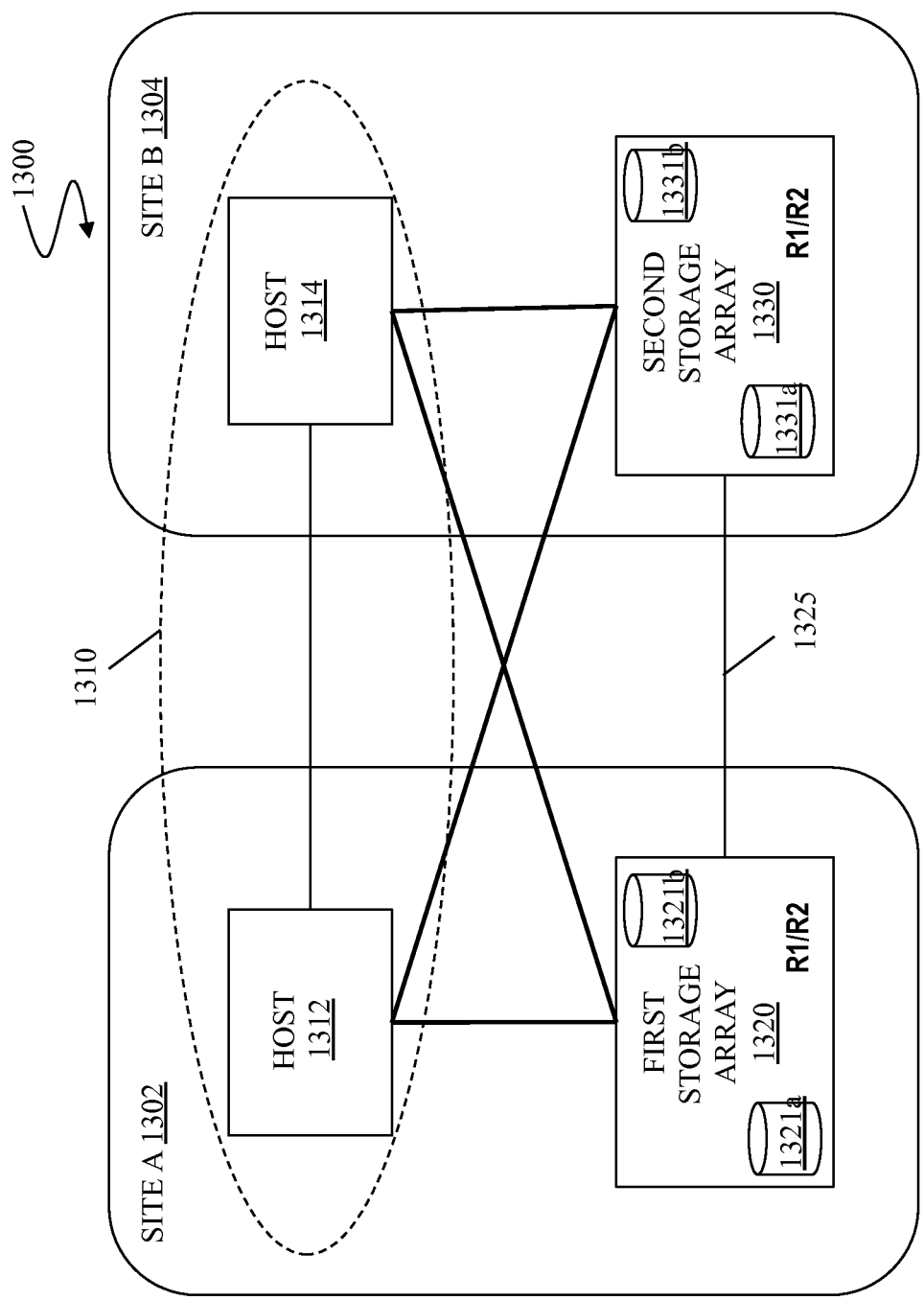
FIG. 17 is a schematic illustration showing another embodiment for multiple site replication system using a host based active/active model according to an embodiment of the system described herein.

FIG. 17 is a schematic illustration showing another embodiment for multiple site replication system 1300 using a host based active/active model according to an embodiment of the system described herein. In the illustrated embodiment, a first storage array 1320 is provided in a Site A 1302 and a second storage array 1330 is provided in a Site B 1304. The hosts 1312, 1314 may be part of a cluster 1310, which may be formed by a group of hosts and/or applications connected together, for example, via a local area network and/or other network. The first and second local storage arrays 1320, 1330 may each include multiple storage volumes, shown as volumes 1321a,b, in storage array 1320 and volumes 1331a,b, in storage arrays 1330. The volumes 1321a,b and 1331a,b, may be storage areas of multiple storage tiers of the storage arrays 1320, 1330. A plurality of hosts 1320, 1330 may be coupled to the first local storage array 1320 and the second local storage array 1330 to conduct read and write operations from and to the local storage arrays 1320, 1330.

A communication path 1325 may also exist between the first storage array 1320 and the second storage array 1330. The communication link 1325 may be used so that the second storage array 1330 is a mirror of the first storage array 1320 (and vice versa). Specifically, each of the storage arrays 1320, 1330 may include R1 devices that may respectively act as a mirrored R2 devices for the other storage array according to various embodiments of the system described herein involving active/active operations. This is illustrated as R1/R2. Each of the storage arrays 1320, 1330 may correspond to multiple types of storage, shown by the different storage units 1321a, 1321b on the system 1320 and the different storage units 1331b, 1331b on the storage array 1330. Accordingly, synchronous data copies from at least one of the hosts 1312, 1314 may be stored in the storage units 1321a and 1331a, of the storage arrays 1320, 1330, respectively, whereas the asynchronous data transfer between the storage arrays 1320, 1330 may be stored in the storage units 1321b and 1331b. The storage units 1321a,b and 1331a,b may be different portions of one storage unit (e.g., different portions of one storage volume) and/or may be represent different types of storage of the storage arrays 1320, 1330. For example, the storage units 1321a,b and 1331a,b, may be storage having different access speeds. In other embodiments, the features of the system 1300 may further be used in addition to other embodiments described herein to provide further replication at additional remote sites.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor.

The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for managing data among a plurality of storage arrays, comprising:
    performing data accesses by a host on a first storage array of a plurality of storage arrays;
    moving data stored on the first storage array between tiers of the first storage array according to block level decisions based on the data accesses by the host at the first storage array;
    characterizing, at the host, the data accesses to generate access pattern information indicating at least a frequency or a rate of the data accesses on the first storage array;
    replicating the data stored on the first storage array to a second storage array;
    transmitting, from the host to the second storage array of the plurality of storage arrays, the access pattern information independently of the replication of the data, wherein the access pattern information is provided to the second storage array at a rate that is less than a rate of the block level decisions at the first storage array, and wherein the second storage array has a storage configuration that is different than a storage configuration of the first storage array; and
    managing data stored on the second storage array according to the access pattern information transmitted independently of the replication, and that is independent of a data access pattern on the second storage array, wherein a data layout on multiple storage tiers of the second storage array is arranged by applying an information life cycle management algorithm to the access pattern information that indicates the data accesses of the host at the first storage array.

2. The method according to claim 1, wherein the access pattern information is received by another host that makes management decisions concerning the data stored on the second storage array.

3. The method according to claim 1, wherein the data stored on the second storage array is managed to match performance requirements being supported by the first storage array.

4. The method according to claim 1, wherein managing data on the second storage array includes storing the data among a plurality of storage tiers of the second storage array.

5. The method according to claim 4, wherein a feature of a first storage tier of the plurality of storage tiers is different from a feature of a second storage tier of the plurality of storage tiers.

6. The method according to claim 1, wherein the access pattern information includes information concerning at least one of: an access rate of the data, frequency of use of the data, a time of last use of the data, and source/requestor information of the data.

7. The method according to claim 1, wherein the access pattern information is transmitted by the host concurrently with being replicated from the first storage array to the second storage array.

8. The method according to claim 1, wherein the access pattern information is periodically transmitted from the host to the second storage array.

9. A non-transitory computer readable medium storing software for managing data among a plurality of storage arrays, the software comprising:
    executable code that performs data accesses by a host on a first storage array of a plurality of storage arrays;
    executable code that moves data stored on the first storage array between tiers of the first storage array according to block level decisions based on the data accesses by the host at the first storage array;
    executable code that replicates the data stored on the first storage array to a second storage array;
    executable code that characterizes, at the host, the data accesses to generate access pattern information indicating at least a frequency or a rate of the data accesses on the first storage array;
    executable code that transmits, from the host to the second storage array of the plurality of storage arrays, the access pattern information independently of the replication of the data, wherein the access pattern information is provided to the second storage array at a rate that is less than a rate of the block level decisions at the first storage array, and wherein the second storage array has a storage configuration that is different than a storage configuration of the first storage array; and
    executable code that manages data stored on the second storage array according to the access pattern information transmitted independently of the replication, and that is independent of a data access pattern on the second storage array, wherein a data layout on multiple storage tiers of the second storage array is arranged by applying an information life cycle management algorithm to the access pattern information that indicates the data accesses of the host at the first storage array.

10. The non-transitory computer readable medium according to claim 9, wherein the access pattern information is received by another host that makes management decisions concerning the data stored on the second storage array.

11. The non-transitory computer readable medium according to claim 9, wherein the data stored on the second storage array is managed to match performance requirements being supported by the first storage array.

12. The non-transitory computer readable medium according to claim 9, wherein the executable code that manages data on the second storage array includes executable code that stores the data among a plurality of storage tiers of the second storage array.

13. The non-transitory computer readable medium according to claim 12, wherein a feature of a first storage tier of the plurality of storage tiers is different from a feature of a second storage tier of the plurality of storage tiers.

14. The non-transitory computer readable medium according to claim 9, wherein the access pattern information includes information concerning at least one of: an access rate of the data, frequency of use of the data, a time of last use of the data, and source/requestor information of the data.

15. The non-transitory computer readable medium according to claim 9, wherein the access pattern information is transmitted by the host concurrently with being replicated from the first storage array to the second storage array.

16. The non-transitory computer readable medium according to claim 9, wherein the access pattern information is periodically transmitted from the host to the second storage array.

17. A storage system, comprising:
   at least one host;
   a plurality of storage arrays including a first storage array storing data and the second storage array that replicates the data stored on the first storage array;
   a plurality of interconnected directors, wherein at least some of the directors handle reading and writing data instructions for the first storage array received from the at least one host;
   a non-transitory computer-readable medium that stores software for managing data, the software including:
   executable code that performs data accesses by a host on the first storage array;
   executable code that moves data stored on the first storage array between tiers of the first storage array according to block level decisions based on the data accesses by the host at the first storage array;
   executable code that replicates the data stored on the first storage array to the second storage array;
   executable code that characterizes, at the host, the data accesses to generate access pattern information indicating at least a frequency or a rate of the data accesses on the first storage array;
   executable code that transmits, from the host to the second storage array of the plurality of storage arrays, the access pattern information independently of the replication of the data, wherein the access pattern information is provided to the second storage array at a rate that is less than a rate of the block level decisions at the first storage array, and wherein the second storage array has a storage configuration that is different than a storage configuration of the first storage array; and
   executable code that manages data stored on the second storage array of the plurality of storage arrays according to the access pattern information transmitted independently of the replication, and that is independent of a data access pattern on the second storage array, wherein a data layout on multiple storage tiers of the second storage array is arranged by applying an information life cycle management algorithm to the access pattern information that indicates the data accesses of the host at the first storage array.

18. The system according to claim 17, wherein the access pattern information is received by another host that makes management decisions concerning the data stored on the second storage array.

* * * * *